(12) United States Patent
Cheung et al.

(10) Patent No.: US 10,699,306 B2
(45) Date of Patent: Jun. 30, 2020

(54) DYNAMIC DIGITAL FLYER SYSTEM

(71) Applicant: FLIPP CORPORATION, Toronto (CA)

(72) Inventors: Matthew Cheung, Mississauga (CA); Erik Charlebois, Toronto (CA); Jeff Francis, Oakville (CA); Wehuns Tan, Oakville (CA)

(73) Assignee: FLIPP CORPORATION, Toronto (CA)

( * ) Notice: Subject to any disclaimer, the term of this patent is extended or adjusted under 35 U.S.C. 154(b) by 682 days.

(21) Appl. No.: 14/394,967

(22) PCT Filed: Feb. 1, 2013

(86) PCT No.: PCT/CA2013/000082
§ 371 (c)(1),
(2) Date: Oct. 16, 2014

(87) PCT Pub. No.: WO2013/113095
PCT Pub. Date: Aug. 8, 2013

(65) Prior Publication Data
US 2015/0134457 A1 May 14, 2015

Related U.S. Application Data

(60) Provisional application No. 61/593,943, filed on Feb. 2, 2012.

(51) Int. Cl.
*G06Q 30/02* (2012.01)
*G06F 3/14* (2006.01)
*H04W 4/21* (2018.01)

(52) U.S. Cl.
CPC ..... *G06Q 30/0267* (2013.01); *G06Q 30/0207* (2013.01); *G06Q 30/0251* (2013.01);
(Continued)

(58) Field of Classification Search
CPC ........... G06Q 30/0267; G06Q 30/0257; G06Q 30/0207; G06Q 30/0251; H04W 4/206; G09G 2340/045; G06F 3/14
(Continued)

(56) References Cited

U.S. PATENT DOCUMENTS 7,158,878 B2   1/2007   Rasmussen et al.
7,209,148 B2   4/2007   Rasmussen et al.
(Continued)

FOREIGN PATENT DOCUMENTS

WO    2008089231 A1    7/2008

OTHER PUBLICATIONS

Superimposing 3D Virtual Objects using Markerless Tracking; Sang-Cheol Park Sang-Woong Lee and Seong-Whan Lee; Published in the 18th ICPR dated 2006.*
(Continued)

*Primary Examiner* — Victoria E Frunzi
(74) *Attorney, Agent, or Firm* — Pearne & Gordon LLP

(57) ABSTRACT

In this disclosure, a system and method for displaying digital flyer having dynamic flyer content on a communication device are disclosed. The system includes a communication module configured to request for a digital flyer from a server and to receive flyer content of the digital flyer from the server, the digital flyer comprising a source flyer image for the flyer content, the source flyer image having one or more regions and an associated modular co⎤ ordinate system, a flyer processing module configured to collect selection information and for generating a request for the digital flyer, the request including the selection information, and a flyer display module configured to display the flyer content communicated from the server, the flyer display module displaying the flyer content using the modular co-ordinate system.

37 Claims, 23 Drawing Sheets

US 10,699,306 B2
Page 2

(52) U.S. Cl.
CPC ............... *H04W 4/21* (2018.02); *G06F 3/14* (2013.01); *G09G 2340/045* (2013.01)

(58) Field of Classification Search
USPC .................................. 705/25, 27, 14.64, 1.1
See application file for complete search history.

(56) References Cited

U.S. PATENT DOCUMENTS

| | | | |
|---|---|---|---|
| 7,379,811 B2 | 5/2008 | Rasmussen et al. |
| 7,570,828 B2 | 8/2009 | Rasmussen et al. |
| 7,599,790 B2 | 10/2009 | Rasmussen et al. |
| 7,620,496 B2 | 11/2009 | Rasmussen et al. |
| 7,762,878 B2 | 7/2010 | Nicholas et al. |
| 7,831,387 B2 | 11/2010 | Golding et al. |
| 7,865,301 B2 | 1/2011 | Rasmussen et al. |
| 7,872,650 B2 | 1/2011 | Fay |
| 7,894,984 B2 | 2/2011 | Rasmussen et al. |
| 7,920,968 B2 | 4/2011 | Chapin et al. |
| 7,962,281 B2 | 6/2011 | Rasmussen et al. |
| 8,005,613 B2 | 8/2011 | Rasmussen et al. |
| 8,014,946 B2 | 9/2011 | Rasmussen et al. |
| 8,130,245 B2 | 3/2012 | Ham et al. |
| 8,131,585 B2 | 3/2012 | Nicholas et al. |
| 8,210,918 B2 | 7/2012 | Nicholas et al. |
| 8,371,916 B2 | 2/2013 | Nicholas et al. |
| 2003/0023489 A1 | 1/2003 | McGuire et al. |
| 2004/0054589 A1 | 3/2004 | Nicholas et al. |
| 2004/0083133 A1 | 4/2004 | Nicholas et al. |
| 2005/0270299 A1 | 12/2005 | Rasmussen et al. |
| 2005/0270305 A1 | 12/2005 | Rasmussen et al. |
| 2005/0270311 A1 | 12/2005 | Rasmussen et al. |
| 2005/0288859 A1 | 12/2005 | Golding et al. |
| 2006/0026067 A1 | 2/2006 | Nicholas et al. |
| 2006/0085259 A1 | 4/2006 | Nicholas et al. |
| 2006/0139375 A1 | 6/2006 | Rasmussen et al. |
| 2006/0184617 A1 | 8/2006 | Nicholas et al. |
| 2006/0206264 A1 | 9/2006 | Rasmussen et al. |
| 2006/0258421 A1 | 11/2006 | Nicholas et al. |
| 2007/0016368 A1 | 1/2007 | Chapin et al. |
| 2007/0043766 A1 | 2/2007 | Nicholas et al. |
| 2007/0096945 A1 | 5/2007 | Rasmussen et al. |
| 2007/0182751 A1 | 8/2007 | Rasmussen et al. |
| 2007/0204308 A1 | 8/2007 | Nicholas et al. |
| 2007/0252834 A1* | 11/2007 | Fay ....................... G06T 3/4092 345/428 |
| 2008/0109327 A1* | 5/2008 | Mayle ................ G06Q 30/0641 705/27.1 |
| 2008/0126476 A1 | 5/2008 | Nicholas et al. |
| 2008/0174593 A1 | 7/2008 | Ham et al. |
| 2008/0291205 A1 | 11/2008 | Rasmussen et al. |
| 2009/0198767 A1 | 8/2009 | Jakobson |
| 2009/0287797 A1 | 11/2009 | Rasmussen et al. |
| 2010/0020091 A1 | 1/2010 | Rasmussen et al. |
| 2010/0146436 A1 | 6/2010 | Jakobson et al. |
| 2010/0201707 A1 | 8/2010 | Rasmussen et al. |
| 2010/0285887 A1 | 11/2010 | Nicholas et al. |
| 2011/0022464 A1 | 1/2011 | Dunn et al. |
| 2011/0137766 A1 | 6/2011 | Rasmussen et al. |
| 2012/0075337 A1 | 3/2012 | Rasmussen et al. |
| 2012/0136724 A1 | 5/2012 | McGuire et al. |
| 2012/0158551 A1* | 6/2012 | Gonsalves ......... G06Q 30/0643 705/27.2 |
| 2012/0162266 A1* | 6/2012 | Douglas ................ G06F 3/0481 345/677 |
| 2012/0188247 A1 | 7/2012 | Cheung et al. |
| 2012/0188280 A1 | 7/2012 | Charlebois et al. |
| 2012/0270619 A1 | 10/2012 | Nicholas et al. |

OTHER PUBLICATIONS https://web.archive.org/web/20110610221703/https://www.w3.org/TR/2011/REC-CSS2-20110607/, Jun. 10, 2011; pp. 1-24, printout obtained Feb. 20, 2020 from the Internet.

* cited by examiner

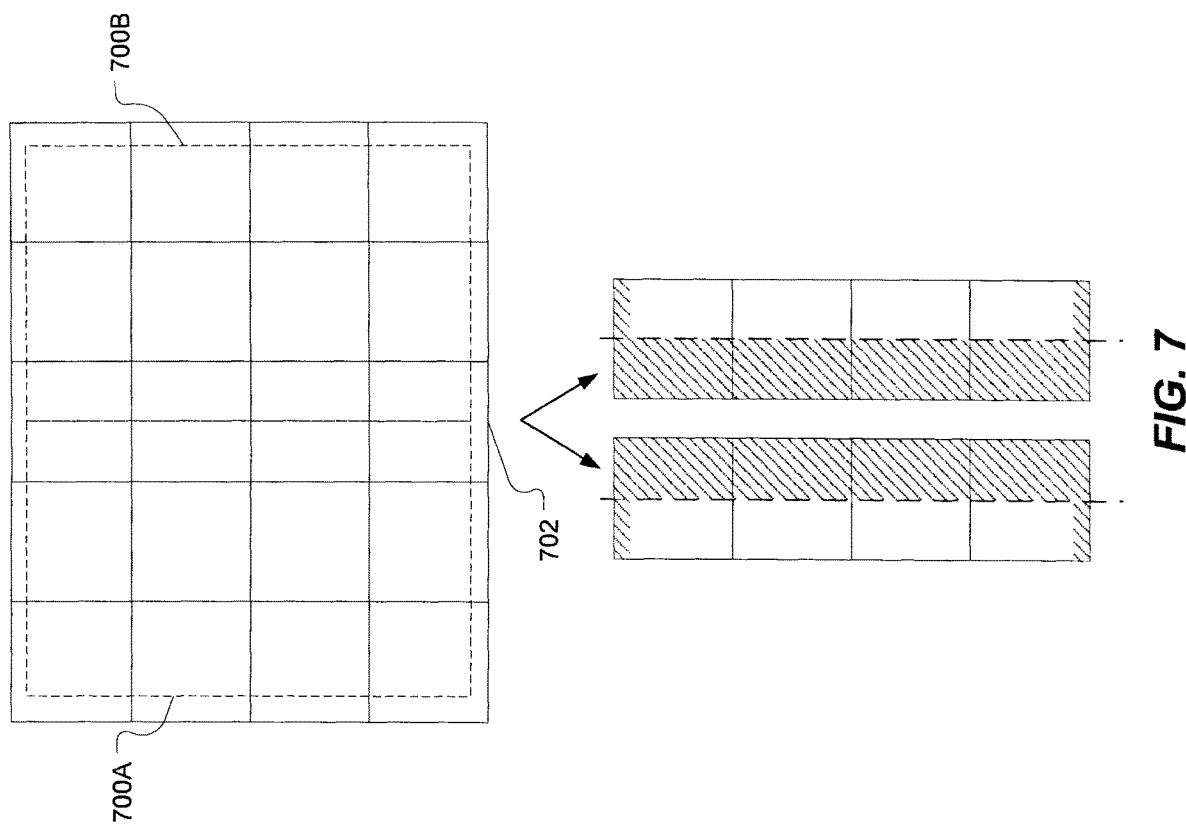

FIG. 9C

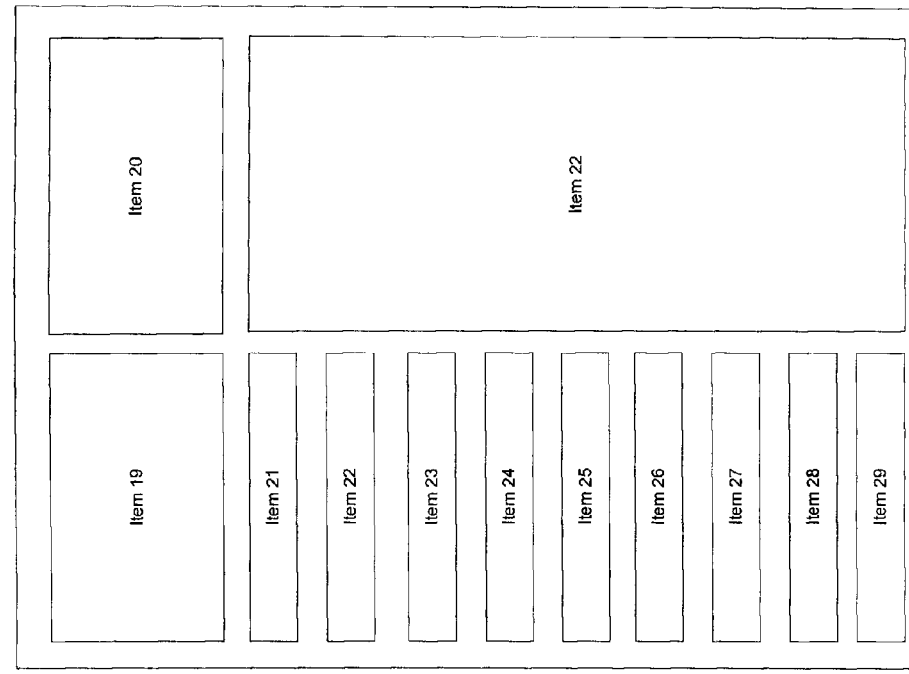
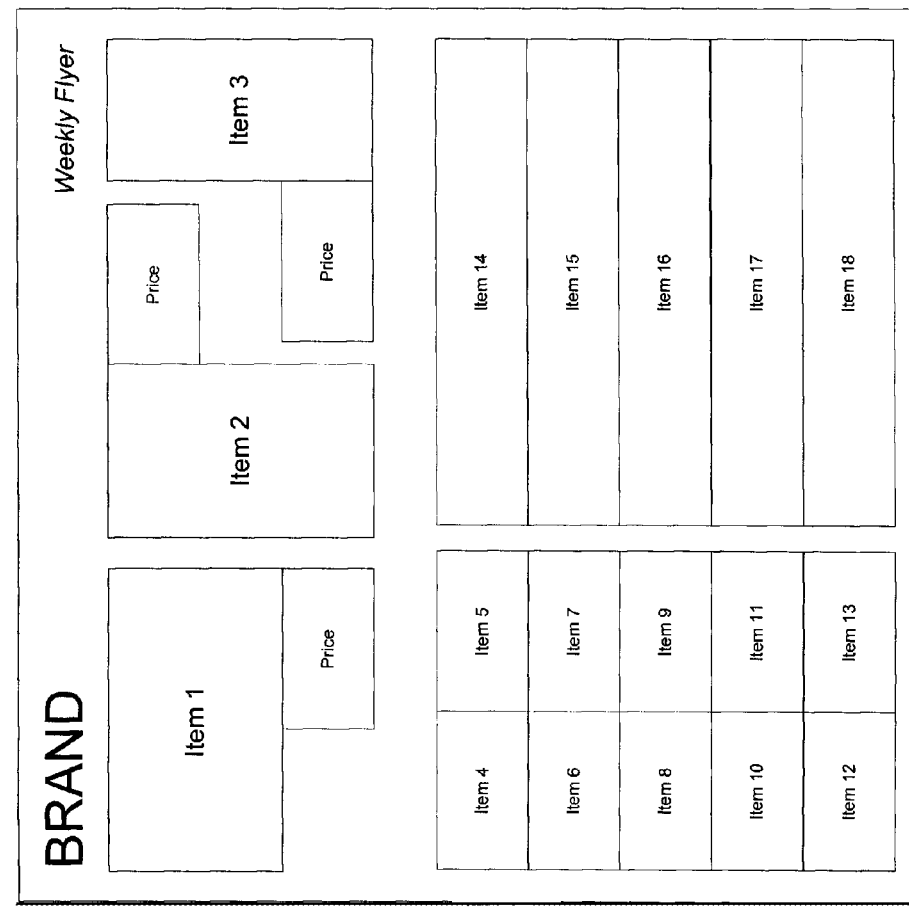
FIG. 11A

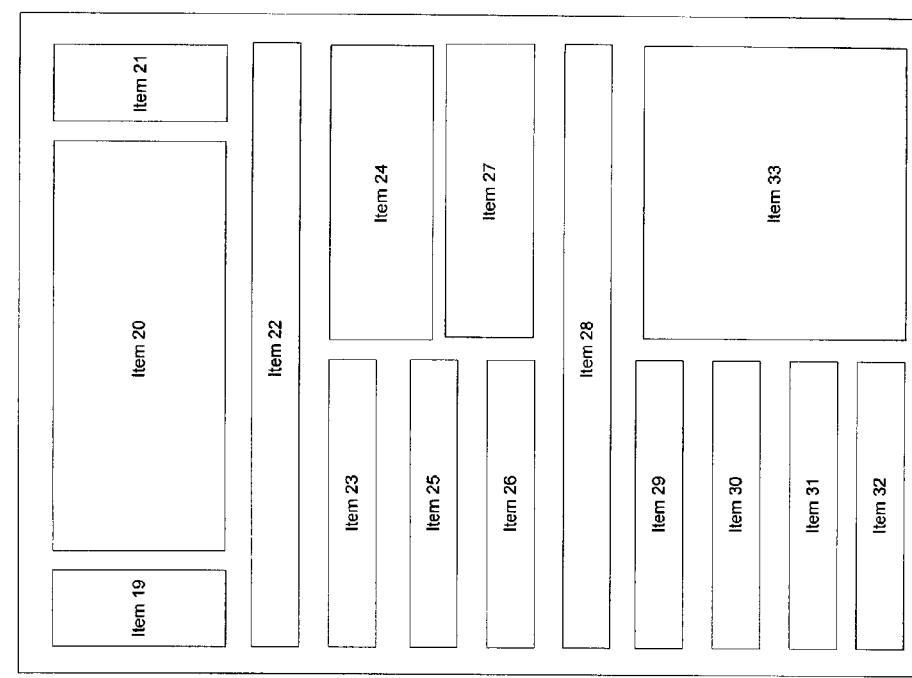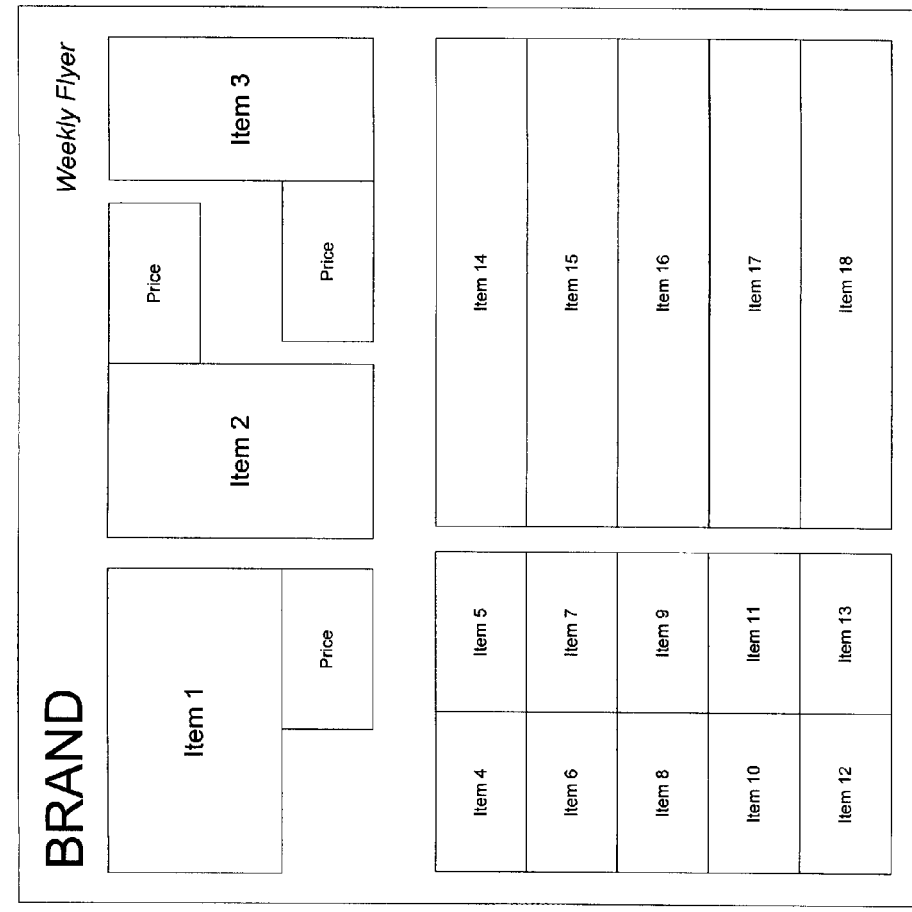
FIG. 11B

DYNAMIC DIGITAL FLYER SYSTEM

TECHNICAL FIELD

The present disclosure relates to digital flyers and in particular, digital flyers having dynamic flyer content.

BACKGROUND

Flyers are used by thousands of shoppers each day to help them make shopping decisions. These flyers offer a glimpse into the different item offerings by vendors, listing newly arrived items, discounted items and other advertising news pertaining to the vendors. As such, vendors spend considerable amount of (financial and creative) resources to create flyers that keep with the vendors' themes. To digitize the flyers, the print flyers are scanned and displayed on the Internet so that the creative elements of the print flyers are not lost, thereby creating an image-based digital flyer to preserve the creative elements of the paper flyer. However, known image-based digital flyer systems do not provide mechanisms to dynamically change the digital flyer content of such image-based digital flyer systems. While systems exist that use HTML and Javascript to create websites of the vendors' offerings, which may include dynamic content, these systems lose the creative elements of the paper flyer. Moreover, while known image-based digital flyer systems may overlay content (including HTML and Javascript), they are not integrated with the digital flyer and fails to keep with the creative elements of the paper flyer.

Accordingly, systems and methods that provide dynamic flyer content for an image-based digital flyer system remain highly desirable.

SUMMARY

According to an embodiment of the present disclosure, a system for displaying digital flyer having dynamic flyer content on a communication device is disclosed. The communication device includes a communication module configured to request for a digital flyer from a server and to receive flyer content of the digital flyer from the server, the digital flyer comprising a source flyer image for the flyer content, the source flyer image having one or more regions and an associated modular co-ordinate system; a flyer processing module configured to collect selection information and for generating a request for the digital flyer, the request including the selection information; and a flyer display module configured to display the flyer content communicated from the server, the flyer display module displaying the flyer content using the modular co-ordinate system.

According to another embodiment of the present disclosure, a method of displaying digital flyer having dynamic flyer content is disclosed. The method includes collecting selection information of a viewer of a digital flyer; generating a request for the digital flyer, the request including the selection information; sending the request for the digital flyer to a server; receiving flyer content of the digital flyer in response to the request, the digital flyer comprising a source flyer image having one or more regions and an associated modular co-ordinate system; and displaying the flyer content in a display of a communication device.

According to a further embodiment, a computer-readable storage medium comprising instructions in code which when loaded into a memory and executed by a processor of a communication device causes the communication device to perform the method of displaying digital flyer having dynamic flyer content is disclosed.

According to an embodiment of the present disclosure, a digital flyer system for generating digital flyer having dynamic flyer content is disclosed. The digital flyer system includes a communication module configured to receive a request for digital flyer and to send flyer content associated with the requested digital flyer; a flyer content generation module configured to retrieve flyer content associated with the requested digital flyer, the digital flyer comprising a source flyer image for the flyer content, the source flyer image having one or more regions; and a flyer co-ordinate module for determining a modular co-ordinate system for the digital flyer.

According to another embodiment of the present disclosure, a method of generating digital flyer having dynamic flyer content is disclosed. The method includes receiving a request for digital flyer from a communication device; retrieving flyer content associated with the requested digital flyer, the digital flyer comprising a source flyer image for the flyer content, the source flyer image having one or more regions; determining a modular co-ordinate system for the digital flyer; and sending the flyer content to the communication device.

According to a further embodiment, a computer-readable storage medium comprising instructions in code which when loaded into a memory and executed by a processor of a communication device causes the communication device to perform the method of generating digital flyer having dynamic flyer content is disclosed.

According to an embodiment of the present disclosure, a method of generating dynamic flyer content of a digital flyer on a communication device is disclosed. The method includes sending a request for the digital flyer to a server, the request including selection information collected from a viewer on the communication device; receiving the dynamic flyer content for the digital flyer from the server, the dynamic flyer content being retrieved based on the selection information; and displaying the dynamic flyer content on a viewport of the communication device, the dynamic flyer content organized based on a pre-defined integration template associated with the selected digital flyer.

According to another embodiment of the present disclosure, a system for generating dynamic flyer content of a digital flyer on a communication device is disclosed. The system includes a communication module for sending a request for the digital flyer to a server, the request including selection information collected from a viewer on the communication device, and receiving the dynamic flyer content for the digital flyer from the server; a flyer processing module configured to organize the received dynamic flyer content based on a pre-defined integration template associated with the selected digital flyer; and a flyer display module configured to display the organized dynamic flyer content in a viewport of the communication device.

In some embodiments, the source flyer image comprises a tile set including one or more copies of the source flyer image segmented into tiles, each copy representing a zoom level of the digital flyer.

In some embodiments, region-edge tiles of the source flyer image are shared between abutting regions, and the tile set comprises every permutations of the region-edge tiles for the abutting regions in the source flyer image.

In some embodiments, region-edge tiles of the source flyer image are not shared between abutting regions, and the region-edge tiles outside of the associated region is rendered transparent.

In some embodiments, the source flyer image comprises multiple copies of the source flyer image, each copy representing a resolution of a viewport of the communication device and segmented into tiles.

In some embodiments, the source flyer image comprises a tile set for each region of the source flyer image, each tile set including one or more copies of the region segmented into tiles, each copy representing a zoom level of the region.

In some embodiments, a pre-fetching module is included in the communication device for assigning a priority score to each region on the source flyer image, the priority score being used to prioritize the pre-loading of each region.

In some embodiments, the selection information is a unique identifier.

In some embodiments, the selection information is a surrounding circumstance of the viewer.

In some embodiments, the surrounding circumstance is location information of the viewer.

In some embodiments, the surrounding circumstance is weather condition.

In some embodiments, the selection information is browsing information of the viewer.

In some embodiments, the browsing information includes information about the communication device.

In some embodiments, the selection information is an identification information for a loyalty program.

In some embodiments, the flyer display module is further configured to hide one of the one or more regions of the source flyer image, and display the hidden one of the one or more regions of the source flyer image in response to a trigger being activated.

In some embodiments, the flyer processing module is further configured to send a request for additional flyer content to the server and incorporate the additional flyer content received from the server into the digital flyer.

In some embodiments, the flyer processing module is further configured to generate a request for additional flyer content.

In some embodiments, the flyer processing module incorporates the additional flyer content received from the server into the digital flyer by organizing the additional flyer content based on a pre-defined integration template, and incorporating the additional flyer content into one of the one or more regions of the source flyer image.

In some embodiments, the flyer processing module incorporates the additional flyer content received from the server into the digital flyer by organizing the additional flyer content based on a pre-defined integration template, and incorporating the additional flyer content as a new region on the source flyer image.

In some embodiments, the additional flyer content is a rendered flyer image and the flyer processing module incorporates the additional flyer content received from the server into the digital flyer by incorporating the additional flyer content into one of the one or more regions of the source flyer image.

In some embodiments, the additional flyer content is a rendered flyer image and the flyer processing module incorporates the additional flyer content received from the server into the digital flyer by incorporating the additional flyer content as a new region of the source flyer image.

In some embodiments, the modular co-ordinate system comprises a root co-ordinate system and a local co-ordinate system for each of the one or more regions.

In some embodiments, the each of the one or more regions corresponds to a page of the digital flyer.

In some embodiments, the one or more regions are demarcated using polygons.

In some embodiments, the flyer content generation module is further configured to add, delete, or replace the one or more regions of the source flyer image.

In some embodiments, the flyer content generation module is further configured to retrieve flyer content from an external source.

In some embodiments, the retrieval of flyer content from an external source is according to a pre-defined integration template.

In some embodiments, the request includes selection information, the selection information being a unique identifier, and the flyer content generation module further configured to retrieve flyer content using the unique identifier.

In some embodiments, the request includes selection information, the selection information being a surrounding circumstance of the viewer, and the flyer content generation module further configured to add, delete, or replace the one or more regions of the source flyer image using the surrounding circumstance of the viewer.

In some embodiments, the request includes selection information, the selection information being a browsing information of the viewer, and the flyer content generation module further configured to add, delete, or replace the one or more regions of the source flyer image using the browsing information of the viewer.

In some embodiments, the request includes selection information, the selection information being an identification information for a loyalty program, and the flyer content generation module further configured to retrieve flyer content using the identification information In some embodiments, the digital flyer comprises a plurality of source flyer images, each source flyer image representing a version of the digital flyer, and wherein the flyer content generation module is further configured to determine different portions between the plurality of source flyer images and to demarcate each of the different portion as a region of the digital flyer.

In some embodiments, the different portions are determined by down-scaling the resolution of each of the plurality of source flyer images.

In some embodiments, the retrieved flyer content is interactive flyer content, and flyer content generation module integrates the interactive flyer content into one of the one or more regions, and wherein the interactive flyer content inherits the modular co-ordinate system of the region.

In some embodiments, at each level of zoom for the region, the level of detail at each zoom level for the interactive flyer content is varied.

In some embodiments, the retrieved flyer content is interactive flyer content, and a subset of the possible permutations of the interactive flyer content is pre-rendered and integrated into the one or more regions.

In some embodiments, the source flyer image comprises a tile set including one or more copies of the source flyer image segmented into tiles, each copy representing a zoom level of the digital flyer.

In some embodiments, region-edge tiles for the tile set are determined to be shared between abutting regions, and the tile set comprises every permutations of the region-edge tiles for the abutting regions in the source flyer image.

In some embodiments, the region-edge tiles for the tile set are determined to not be shared between abutting regions, and the region-edge tiles outside of the associated region is rendered transparent.

In some embodiments, the source flyer image comprises a plurality of the tile set, each tile set representing a resolution of a viewport of the communication device.

In some embodiments, the source flyer image comprises a tile set for each region of the source flyer image, each tile set including one or more copies of the region segmented into tiles, each copy representing a zoom level of the region.

In some embodiments, the digital flyer comprises a source flyer image for the dynamic flyer content, the source flyer image having one or more regions and an associated modular co-ordinate system.

In some embodiments, generating the dynamic flyer content of a digital flyer on a communication device further includes incorporating the organized dynamic flyer content into the one or more regions of the source flyer image.

In some embodiments, displaying the dynamic flyer content on a viewport of the communication device comprises using the modular co-ordinate system to display the dynamic flyer content on the viewport of the communication device.

In some embodiments, the dynamic flyer content is retrieved from an external source using the selection information.

In some embodiments, generating the dynamic flyer content of a digital flyer on a communication device further includes categorizing the viewer into one or more pre-defined viewer profiles.

In some embodiments, the dynamic flyer content are organized based on the pre-defined integration template associated with the selected digital flyer and the one or more pre-defined viewer profiles.

In some embodiments, the flyer processing module is further configured to incorporate the organized dynamic flyer content into the one or more regions of the source flyer image.

In some embodiments, the flyer display module is further configured to display the organized dynamic flyer content in the viewport of the communication device using the module co-ordinate system.

In some embodiments, the flyer processing module is further configured to categorize the viewer into one or more pre-defined viewer profiles.

BRIEF DESCRIPTION OF THE DRAWINGS

Further features and advantages of the present technology will become apparent from the following detailed description, taken in combination with the appended drawings, in which:

FIG. 7 illustrates a second embodiment of region-edge tiles implementation for use with digital flyer having segmented source flyer image;

FIGS. 9A-9C illustrate an embodiment for dynamic flyer content generation;

FIGS. 11A-11B illustrate a process for identifying potential regions on different versions of the source flyer image;

It will be noted that throughout the appended drawings, like features are identified by like reference numerals.

DETAILED DESCRIPTION

Figure 1:
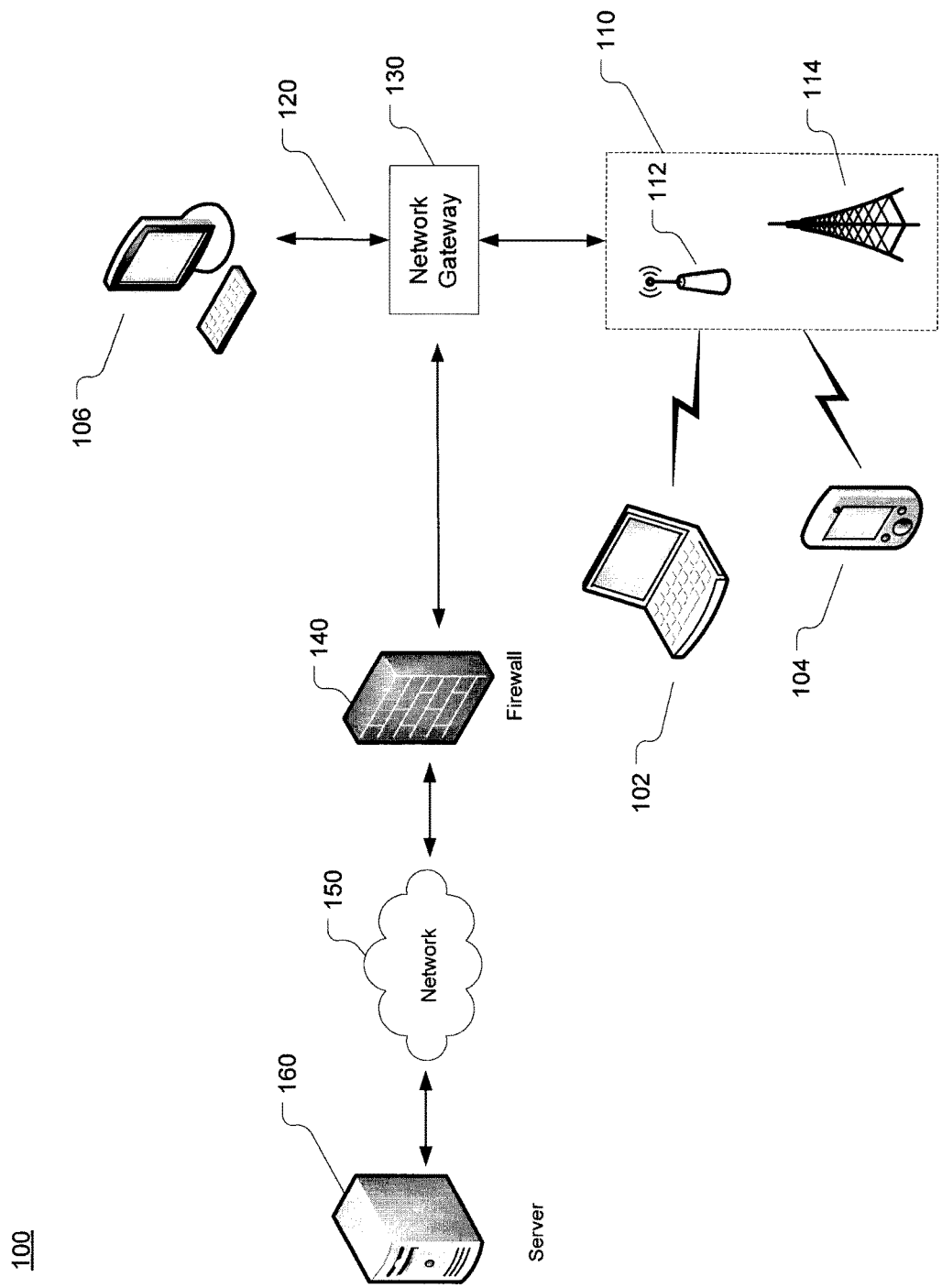
FIG. 1 depicts a block diagram of a communication system in which an embodiment of the present disclosure may be applied.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this disclosure belongs.

It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

The term "user" in the present disclosure is used to refer to any user of the interactive flyer system including publishers, vendors and viewers.

The term "publisher" refers to the user of the interactive flyer system responsible for preparing the interactive digital flyer according to an embodiment of the present technology.

The term "vendor" or "merchant" in this disclosure may be used interchangeably to refer to the business using the interactive digital flyer for marketing and business purposes.

The term "viewer" refers to the user of the interactive flyer system viewing the interactive digital flyer according to an embodiment of the present technology.

The term "wireless communication technology" is intended to describe any communication protocol that enables a communication device to communicate with a server without wires. By way of example, but not limitation, wireless communication protocol may include IEEE 802.11x standards (sometimes referred to as Wi-Fi) such as, for example, the IEEE 802.11a, 802.11b, 802.11g, and/or 802.11n standard. Other communication protocols include: IEEE 802.16e (also referred to as Worldwide Interoperability for Microwave Access or "WiMAX"); IEEE 802.20 (also referred to as Mobile Wireless Broadband Access); Mobitex Radio Network, DataTAC; GPRS (General Packet Radio System); TDMA (Time Division Multiple Access) including GSM (Global System for Mobile Communication); CDMA (Code Division Multiple Access) including CDMA 2000 and UTRA (Universal Terrestrial Radio Access); FDMA (Frequency Division Multiple Access); OFDMA (Orthogonal FDMA), SC-FDMA (Single-Carrier FDMA); CDPD (Cellular Digital Packet Data); iDEN (integrated Digital Enhanced Network); EvDO (Evolution-Data Optimized); EDGE (Enhanced Data rates for GSM Evolution); UMTS (Universal Mobile Telecommunication Systems); HSPDA (High-Speed Downlink Packet Access); and other various network technologies, including LTE-advanced technologies. An OFDMA system utilizes Orthogonal Frequency Division Multiplexing (OFDM) and sends modulation symbols in the frequency domain on orthogonal subcarriers, and may be implemented in technologies such as E-UTRA or E-UTRAN.

The details and particulars of these aspects of the technology will now be described below, by way of example, with reference to the attached drawings.

Referring to FIG. 1, there is shown a block diagram of a communication system 100 in which an embodiment of the present technology can be applied. It should be expressly understood that this figure is intentionally simplified to show only certain main components. The communication system 100 may include other components beyond what is illustrated in FIG. 1.

The communication system 100 includes a number of communication devices 102, 104, 106 which may be connected to other devices in the communication system 100 in any of several different ways. Accordingly, three different types of communication devices 102, 104, 106 are depicted in FIG. 1 employing different exemplary ways of connecting to other devices in the communication system 100. It should be expressly understood that communication devices other than those shown in FIG. 1 may be used to connect to the communication system 100. Communication devices 102, 104, 106 may be connected to, for example, the server 160 using wireless technologies or wired communication technologies. Flyer viewers may use the communication devices 102, 104, 106 to browse the digital flyer having dynamic flyer content as disclosed in the present disclosure. The digital flyer system according to an embodiment of the present disclosure may be implemented on the server 160 and communicate with the communication devices to generate and display dynamic flyer content.

In one embodiment, communication devices 102, 104 may connect to the server 160 using wireless communication technology 110. To facilitate the provision of wireless technology 110, there may be provided one or more wireless RF Access Points (AP) 112 and base stations 114.

In another embodiment, communication device 106 may connect to the server 160 using wired communication technology 120 such as IEEE 802.3 standard. Other wired communication technologies may be contemplated by a skilled person in the art.

Using wireless or wired technologies, communication devices 102, 104, 106 connect to the network gateway 130. The internal network 150 is typically behind a firewall 140, which serves to safeguard the internal network 150 from unauthorized access. Only authorized communication devices 102, 104, 106 are granted access to the server 160.

Figure 2:
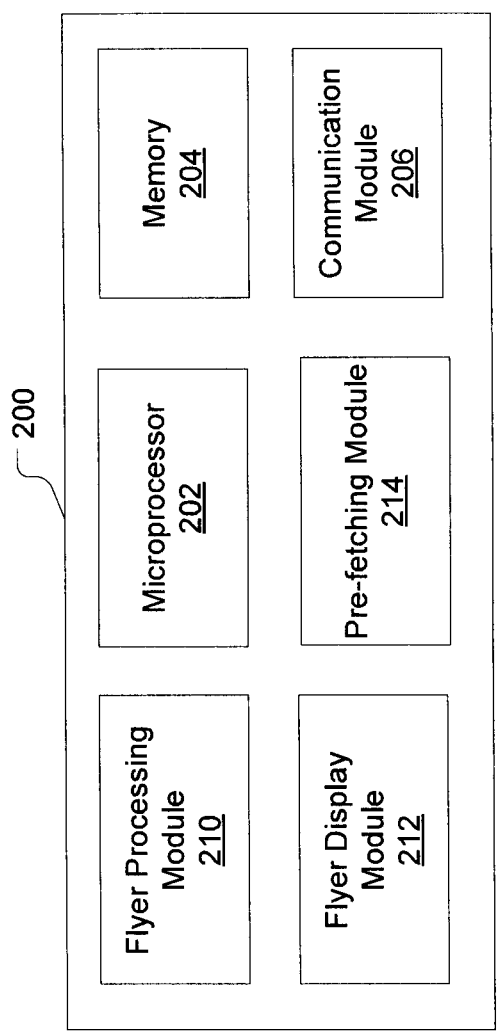
FIG. 2 depicts a block diagram of a communication device on which an embodiment of the present disclosure may be implemented.

Turning to FIG. 2, a block diagram 200 of a communication device for displaying dynamic flyer content according to one embodiment in the present disclosure is shown. The block diagram 200 may be those of the communication devices 102, 104 or 106 in FIG. 1. The communication device includes a microprocessor 202, a memory 204 and a communication module 206. The memory 204 may be in the form of a random access memory (RAM), flash memory, magnetic disk, solid state drives or other forms of storage format. The communication module 206 may include wireless and wired communication technologies. Further, the communication device includes a flyer processing module 210 and flyer display module 212. Additionally, the communication device may include a pre-fetching module 214.

Figure 3:
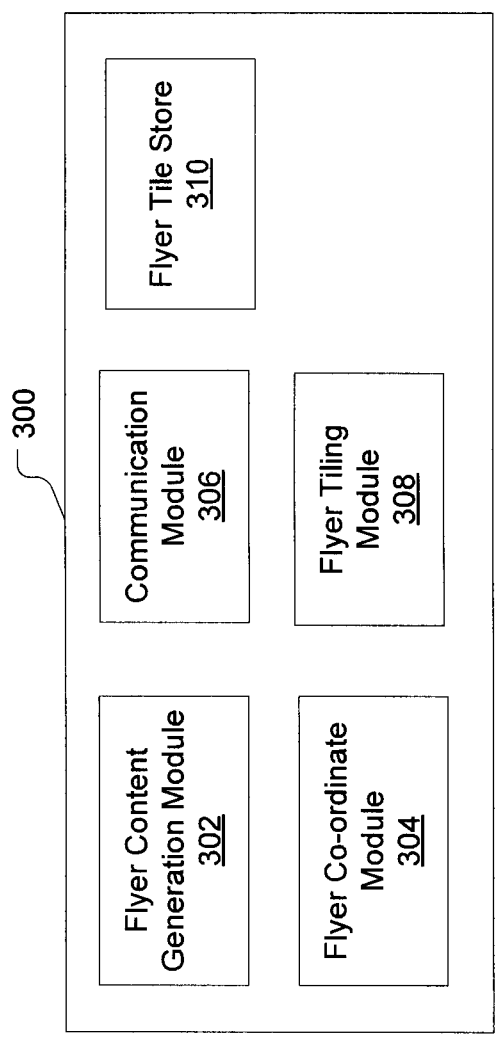
FIG. 3 depicts a block diagram of a digital flyer system according to an embodiment of the present disclosure.

Now turning to FIG. 3, a block diagram 300 of a digital flyer system according to an embodiment of the present disclosure is disclosed. The digital flyer system includes a flyer content generation module 302, a flyer co-ordinate module 304 and a communication module 306. Additionally, the digital flyer system may include a flyer tiling module 308 and a flyer tile store 310. The digital flyer system may be implemented on the server 160.

Thus using the communication device in FIG. 2 and the digital flyer system in FIG. 3, the communication device is able to display a digital flyer having dynamic flyer content. For example, the dynamic flyer content may be a flyer page that is added, deleted or swapped depending on various factors of the viewer or needs of the vendor.

Modular Co-Ordinate System

Figure 4A:
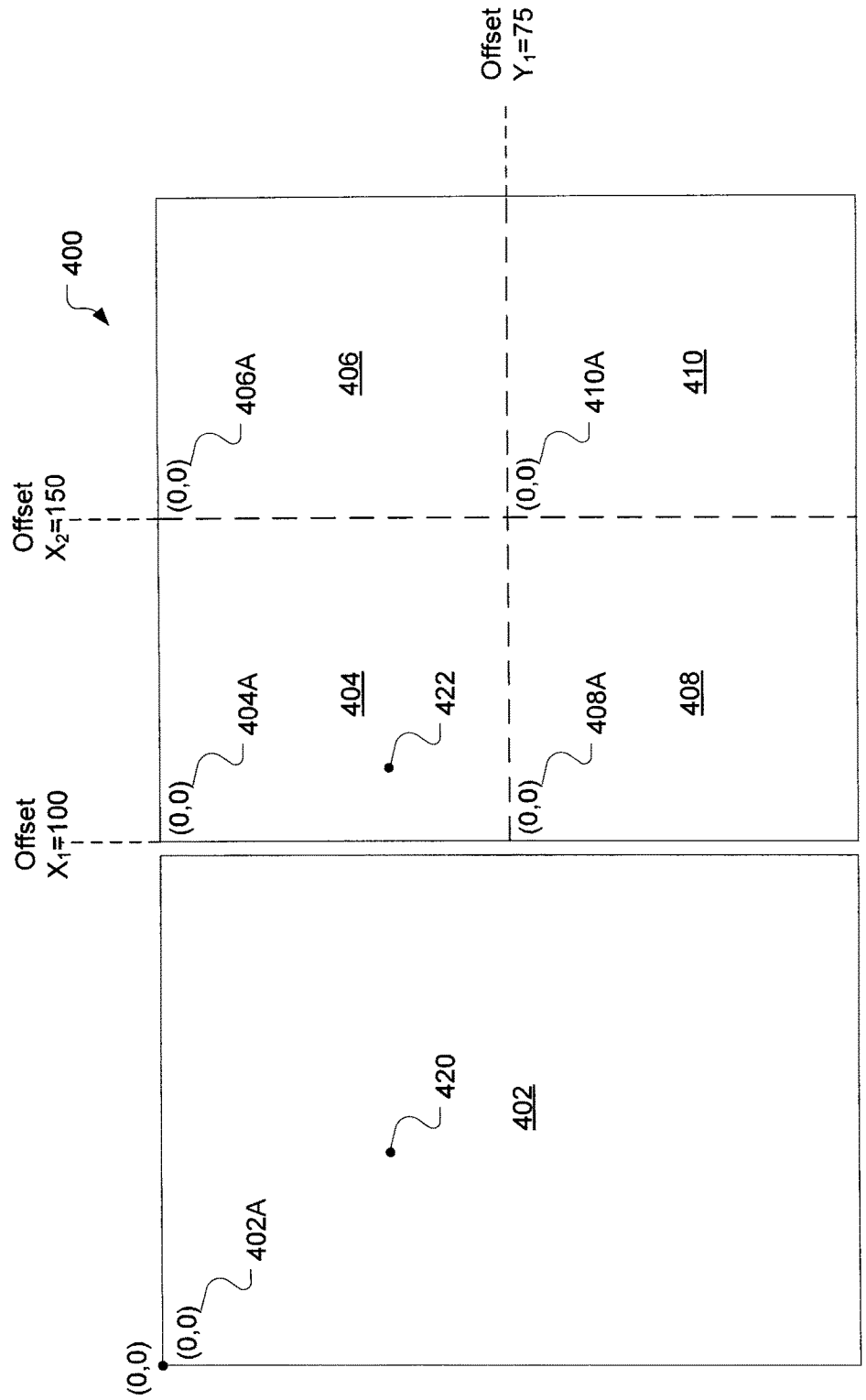
FIG. 4A illustrates a modular co-ordinate system for the one or more regions of a digital flyer according to an embodiment of the present disclosure.

Referring to FIG. 4A, a digital flyer 400 having dynamic flyer content according to an embodiment of the present disclosure is shown. In FIG. 4A, the digital flyer 400 contains regions 402-410, with each region defining an area on the digital flyer 400 that can contain dynamic flyer content. In one embodiment, the region 402 may be removed from the digital flyer 400 and replaced with a new region depending on the geographic area in which the viewer is located. In another embodiment, region 404 may contain flyer content with which the viewer may interact. For example, the region 404 may display an extendable dining table, with which the viewer can interact to visualize the different seating configurations. The regions may or may not correspond with flyer pages. For example, region 402 may represent the entire flyer page and regions 404-410 may be sections within a flyer page.

Figure 4B:
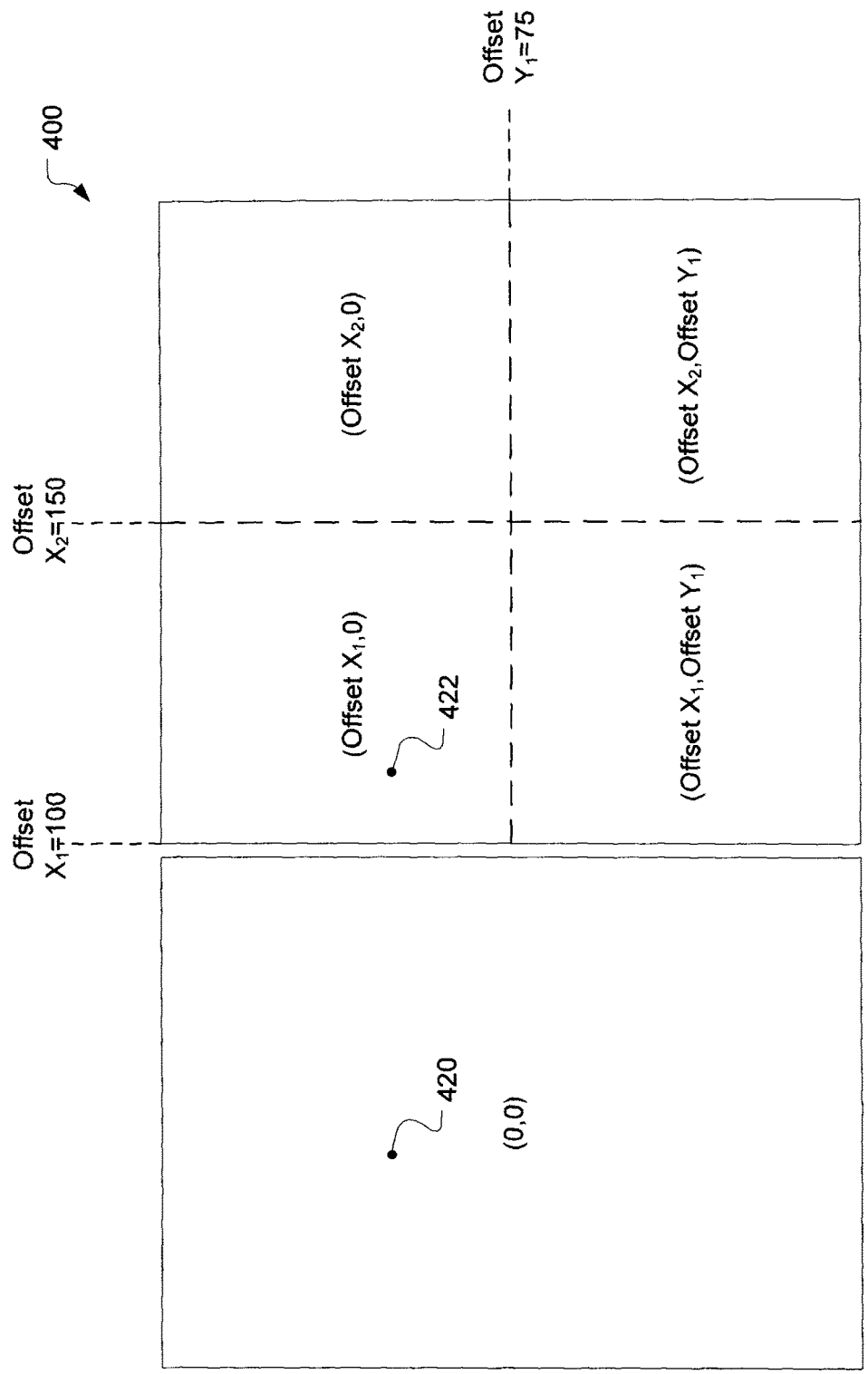
FIG. 4B illustrates the digital flyer in FIG. 4A and the root offset values.

Since the flyer content of the digital flyer 400 may change, the digital flyer system according to the present disclosure includes a flyer co-ordinate module 304. The flyer co-ordinate module 304 creates a modular co-ordinate system for the digital flyer 400 and maintains the co-ordinate system as the flyer content on the digital flyer 400 is dynamically altered. The modular co-ordinate system comprises a root co-ordinate system and one local co-ordinate system for each region defined on the digital flyer. The local co-ordinate system is a co-ordinate space that is contained within each region and can be considered to have a parent-child relationship with the root co-ordinate system. In other words, the modular co-ordinate system may also be referred to as a multi-level co-ordinate system. The parent-child relationship is maintained using a root offset value (an example which is shown in FIG. 4B), which determines the position of each region with respect to the root co-ordinate system. Thus, any point in the region is referenced using only the local co-ordinate system regardless of the position of the region with respect to the root co-ordinate system. Even if the position of the region is changed, all co-ordinates in the region remain the same. In other words, each region is self-contained and the root offset values of each region maintains the relationship between the regions with respect to the root co-ordinate system.

Now referring to FIG. 4A to illustrate an example embodiment, the digital flyer 400 is shown to have five regions 402-410, with each region having its own local co-ordinate system. On the top left corner of each region, local origins 402A-410A are shown. While the local origins 402A-410A are shown to be located at the top left corner of each region, it will be understood that local origins may be located in other areas of the region. For example, the local origins may be the bottom left corner of each region. Moreover, each region includes a root offset value as shown in FIG. 4B. For regions 402-410, the root offset values are (0,0), (Offset $X_1$, 0), (Offset $X_2$, 0), (Offset $X_1$, Offset $Y_1$) and (Offset $X_2$, Offset $Y_1$), respectively. The root offset values are used to convert between the local co-ordinate system and the root co-ordinate system as it will be further explained in this disclosure.

Figure 4C:
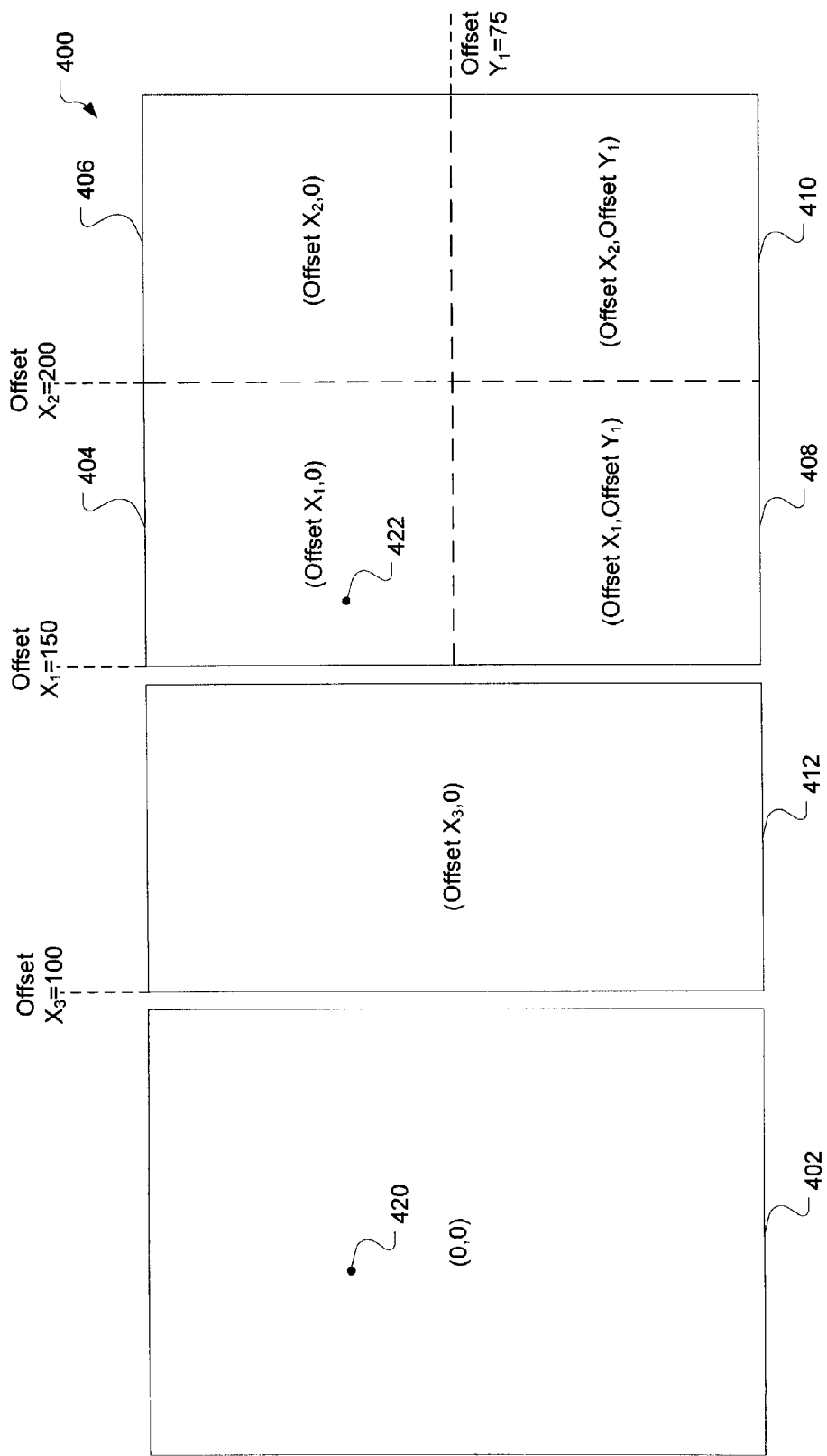
FIG. 4C illustrates how the modular co-ordinate systems are used in conjunction with the one or more regions of the digital flyer.

In FIG. 4A, points of interests 420 and 422 are shown having local co-ordinates (45, 50) and (10, 50), respectively. The points of interests 420 and 422 may represent a variety of different things on the digital flyer. For example, the points of interests may be discounted items, popular items, new arrival items, coupons and any other points of interests. These co-ordinates are relative to their respective local origins 402A and 404A and remain the same regardless of the position of their respective regions. For example, the digital flyer system may insert a new region 412 as shown in FIG. 4C. With the insertion of the new region 412, the digital flyer system updates the root offset values of all the affected regions, namely regions 404-410. The advantage is that the point 422 still retains the co-ordinates of (10, 50) regardless of the position of region 404. In other words, rather than update all the co-ordinates for the points of interests in each region, the root offset serves as the only value that requires updating for all the coordinates in the region. This saves considerable resources on the digital flyer system.

To determine their true position, the offset values of each region is applied to the co-ordinates of the points. In FIG. 4B, the points 420 and 422 would have root co-ordinate values of (45, 50) and (110, 50) and in FIG. 4C, the points 420 and 422 would have values (45, 50) and (160, 50). As in the example, the individual points on the digital flyer 400 need not be updated as flyer content is changed. Rather, only the root offset values for the affected regions are updated.

In a further embodiment, the modular co-ordinate system may be used with source flyer image that are segmented into tiles. The process of segmenting the source flyer image into tiles may be as described in the commonly owned U.S. patent application Ser. No. 13/011,602 (referred herein as "commonly owned flyer image tiling application"), which is incorporated herein by reference. The segmented tiles may be in the form of power-of-two tiles or otherwise.

As described in the present disclosure, one or more regions of the source flyer image may be added, deleted or otherwise changed to alter the flyer content. If the source flyer image is segmented into tiles, tiles may span one or more regions of the source flyer image and the modification of such tiles need to be dealt with. In the present disclosure, three embodiments are discussed for illustrative purposes.

Figure 5:
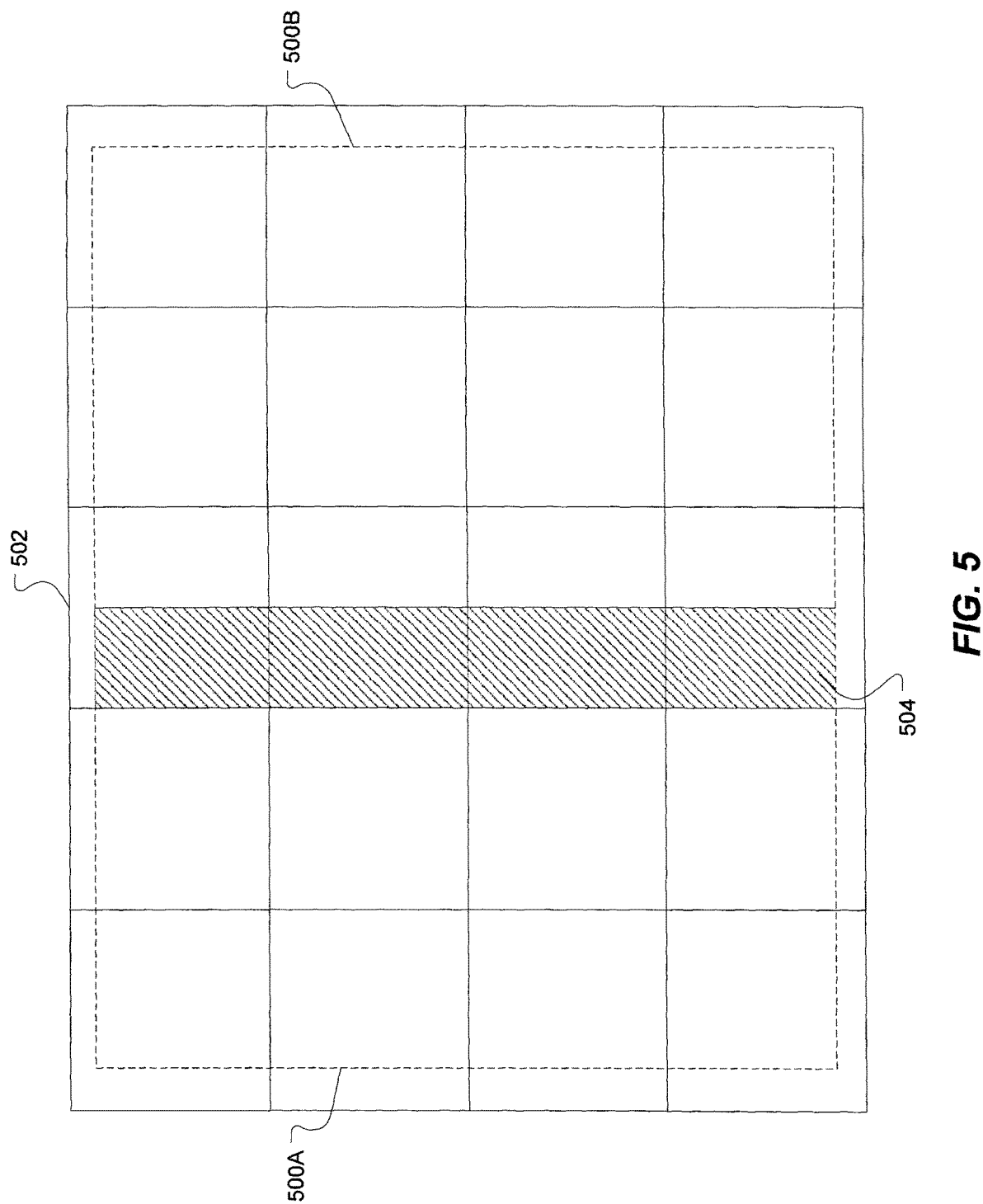
FIG. 5 illustrates a portion of the digital flyer having two abutting regions and the digital flyer segmented into tiles.

Referring to FIG. 5, two regions 500A and 500B of a source flyer image is shown. While two regions are shown, it will be understood that the embodiments disclosed in the present disclosure with respect to the use of tiled source flyer image may be used with source flyer images having one or more regions. As illustrated in FIG. 5, the four tiles shown in column 502 span across the two regions 500A and 500B (such tiles will also be referred in the present disclosure as "region-edge tiles"). If, for example, region 500B is removed from the digital flyer, the region-edge tiles in column 502 would be removed. Consequently, the region 500A would be missing tiles as shown by the shaded area 504 in FIG. 5. Similarly, if a third region, is inserted between regions 500A and 500B, the region-edge tiles would also be invalid.

Figure 6A:
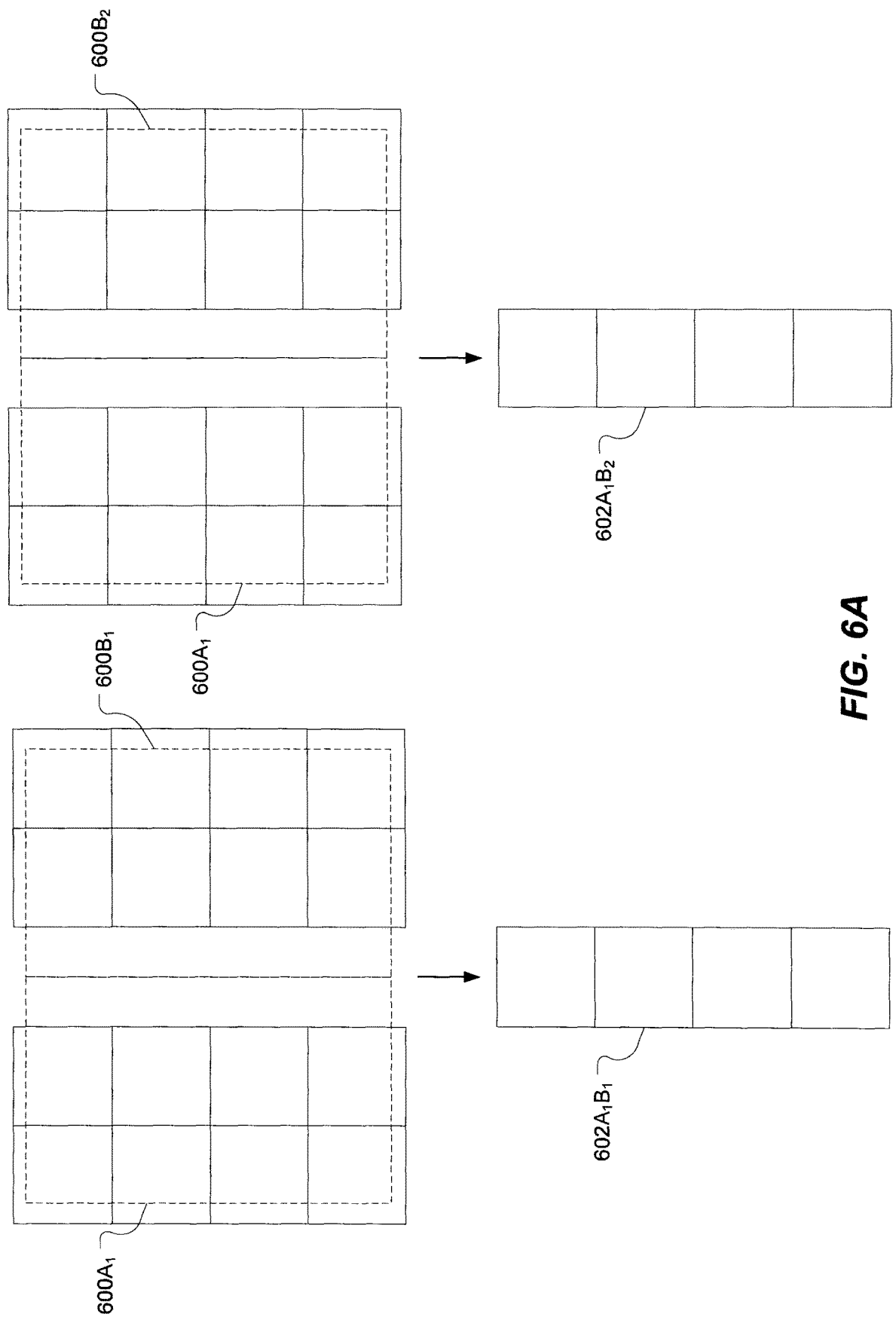
FIGS. 6A-6B illustrate a first embodiment of region-edge tiles implementation for use with digital flyer having segmented source flyer image.
Figure 6B:
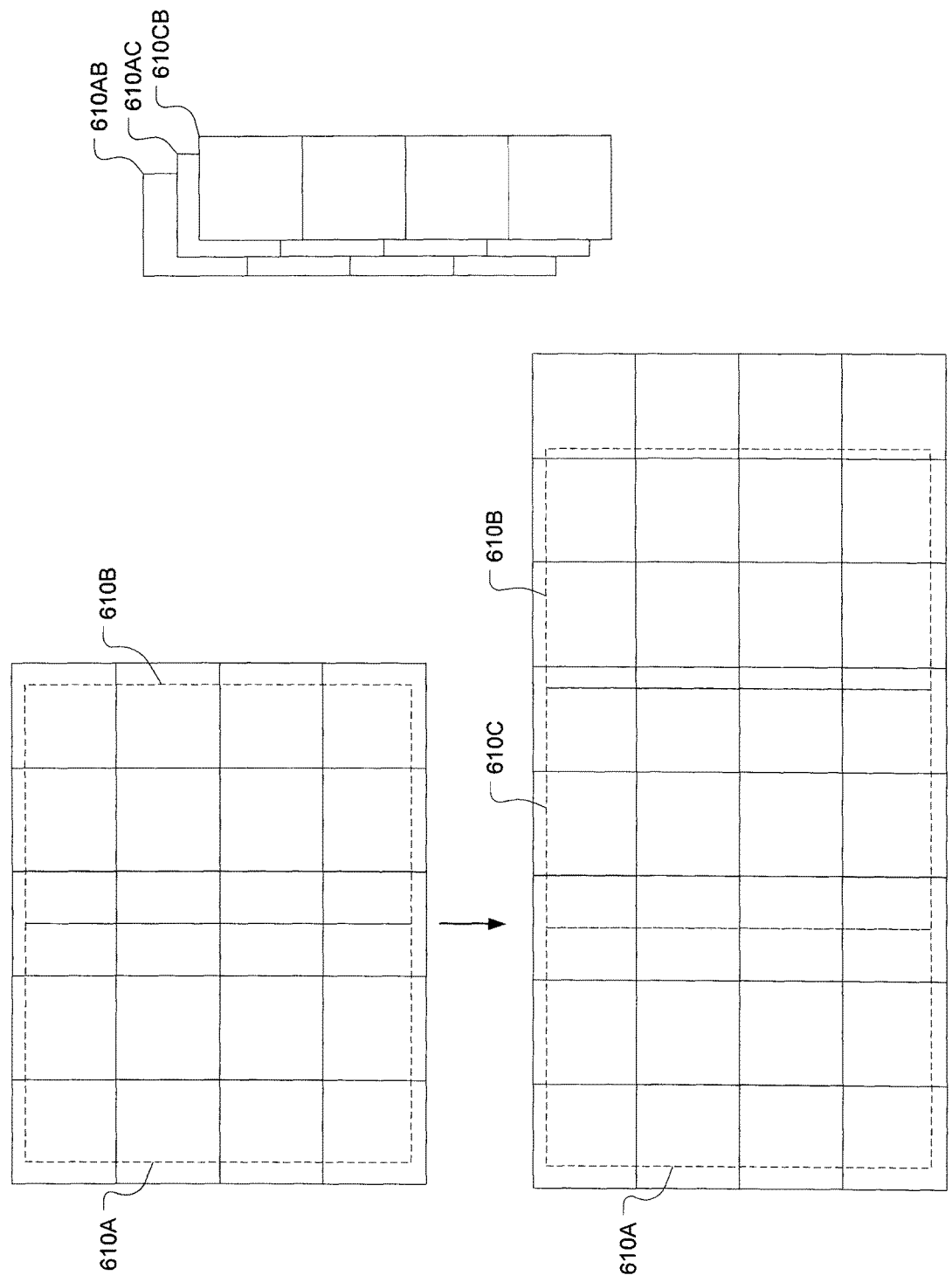

In a first embodiment, shown in FIGS. 6A-6B, renders multiple versions of the region-edge tiles depending on different combinations of abutting regions. In FIG. 6A, for simplicity, region $600A_1$ is shown to have two possible abutting regions $600B_1$ and $600B_2$. In this embodiment, the flyer tiling module 308 renders two different sets of tiles for the region-edge tiles. Since region $600A_1$ may abut with region $600B_1$ or $600B_2$, the flyer tiling module 308 renders region-edge tiles $602A_1B_1$ and $602A_1B_2$. Thus, when, for example, region $600B_1$ is swapped with region $600B_2$, the region-edge tiles $602A_1B_1$ is swapped with region-edge tiles $602A_1B_2$.

Addition of regions between existing regions may also be dealt with as shown in FIG. 6B. In FIG. 6B, regions 610A and 610B are shown to abut. According to embodiments discussed in the present disclosure, flyer content may be altered by inserting region 610C in between regions 610A and 610B. In this embodiment, the digital flyer system renders all the different combinations of the region-edge tiles, in which case are region-edge tiles 610AB, 610AC and 610CB as shown in FIG. 6B.

Thus, in the first embodiment, flyer tiling module 308 renders all combinations of region-edge tiles for the different combinations of abutting regions as detected by the digital flyer system. When the flyer tiling module 308 determines that abutting regions have changed, the flyer tiling module 308 selects the appropriate region-edge tile from the available combinations of region-edge tiles.

In a second embodiment, the region-edge tiles are multi-layered to reduce the number of region-edge tiles created. Referring back to FIG. 6A, suppose that there are six total regions: $600A_x$ and $600B_y$, where x=1 . . . 3 and y=1 . . . 3. This would result in nine different region-edge tiles combinations. In the second embodiment, tiles in regions that span across more than a single region are rendered once per region. In other words, in the same example where there are six total regions, there would be a total of six different region-edge tiles rendered. In exchange for the saving in the number of region-edge tiles rendered, the communication device displaying the flyer image tiles must be able to layer the region-edge tiles and render overlapping portions of the region-edge tiles transparent.

An example is illustrated in FIG. 7. In FIG. 7, the digital flyer system detects that the tiles in the column 702 span across more than a single region. For these tiles, the flyer tiling module 308 renders these tiles once per applicable region. So, the region-edge tiles 702 are rendered once for region 700A and once for region 700B. Portions of the tiles outside of the region are then made transparent (i.e. the shaded regions in FIG. 7) so that when the regions 700A and 700B are made to abut as shown in FIG. 7, the flyer content in the overlapped regions of the region-edge tiles are displayed correctly. When region 700B is removed from the digital flyer, the flyer image tiles for the region 700A would still remain complete since region-edge tiles are rendered per region. In this embodiment, the digital flyer system need not be aware of the different combinations of regions abutting one another.

In a third embodiment, each region of the source flyer image is segmented into tiles independently. In the first two embodiments discussed, the source flyer image as a whole is used to segment the image into tiles. During or after segmentation, the flyer tiling module 308 identifies the region-edge tiles to implement the process as described for the first two embodiments. In the third embodiment, each region on the source flyer image is treated separately. Each region of the source flyer image is segmented into tiles and portions of the tiles that extend outside of the region are clipped or made transparent. Since each region is tiled independently from other regions, the flyer tiling module 308 does not need to identify the region-edge tiles as in the first two embodiments. After tiling, any tiles that extend outside of the region are clipped or made transparent. The extension of the tiles to the outside of the region occurs when region cannot be segmented into equal sized tiles. While the present embodiment is described using equal sized source flyer image tiles, it will be understood that uneven sized source flyer image tiles may be used.

Figure 8A:
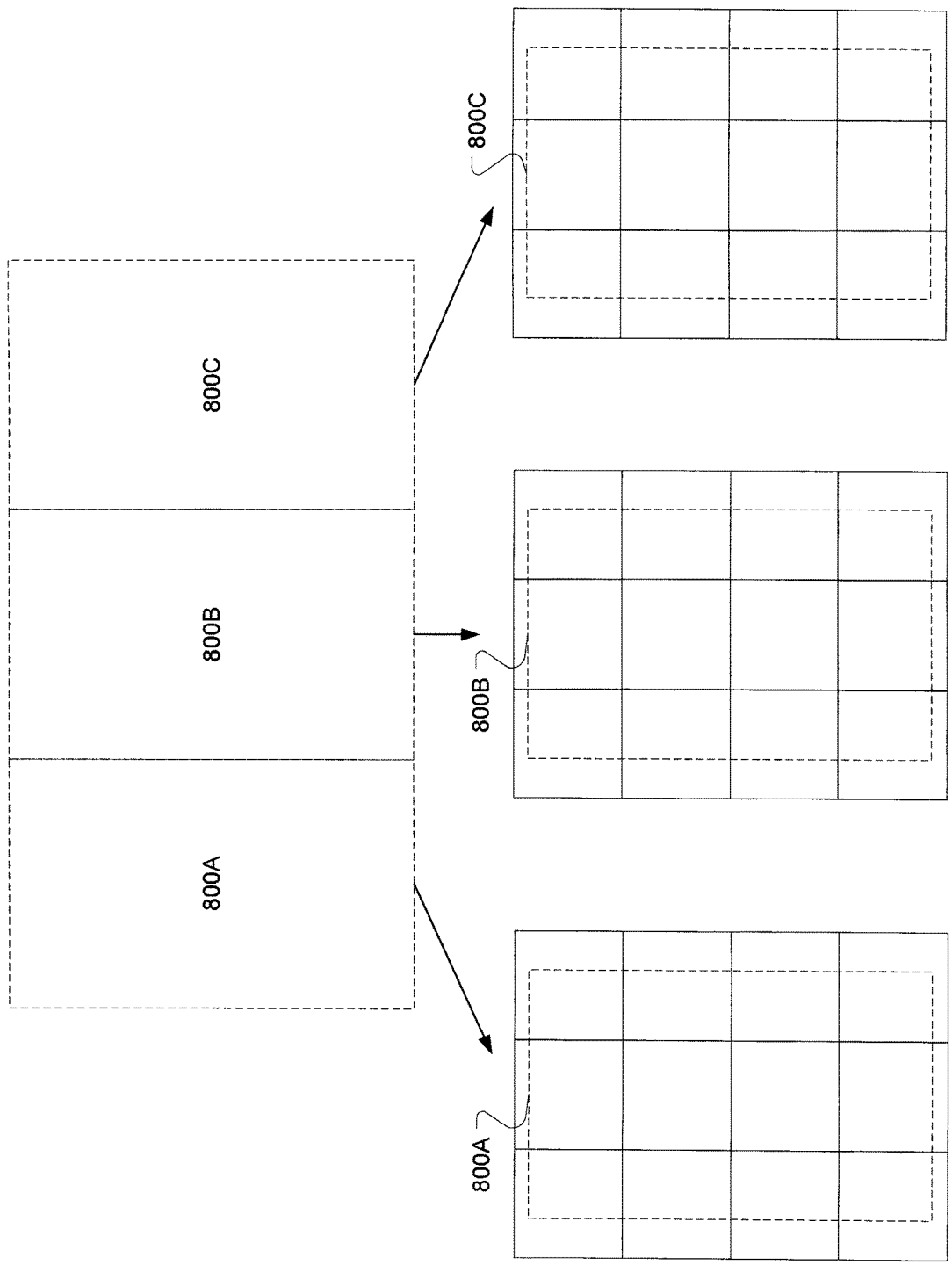
FIGS. 8A-8B illustrate a third embodiment of region-edge tiles implementation for use with digital flyer having segmented source flyer image.
Figure 8B:
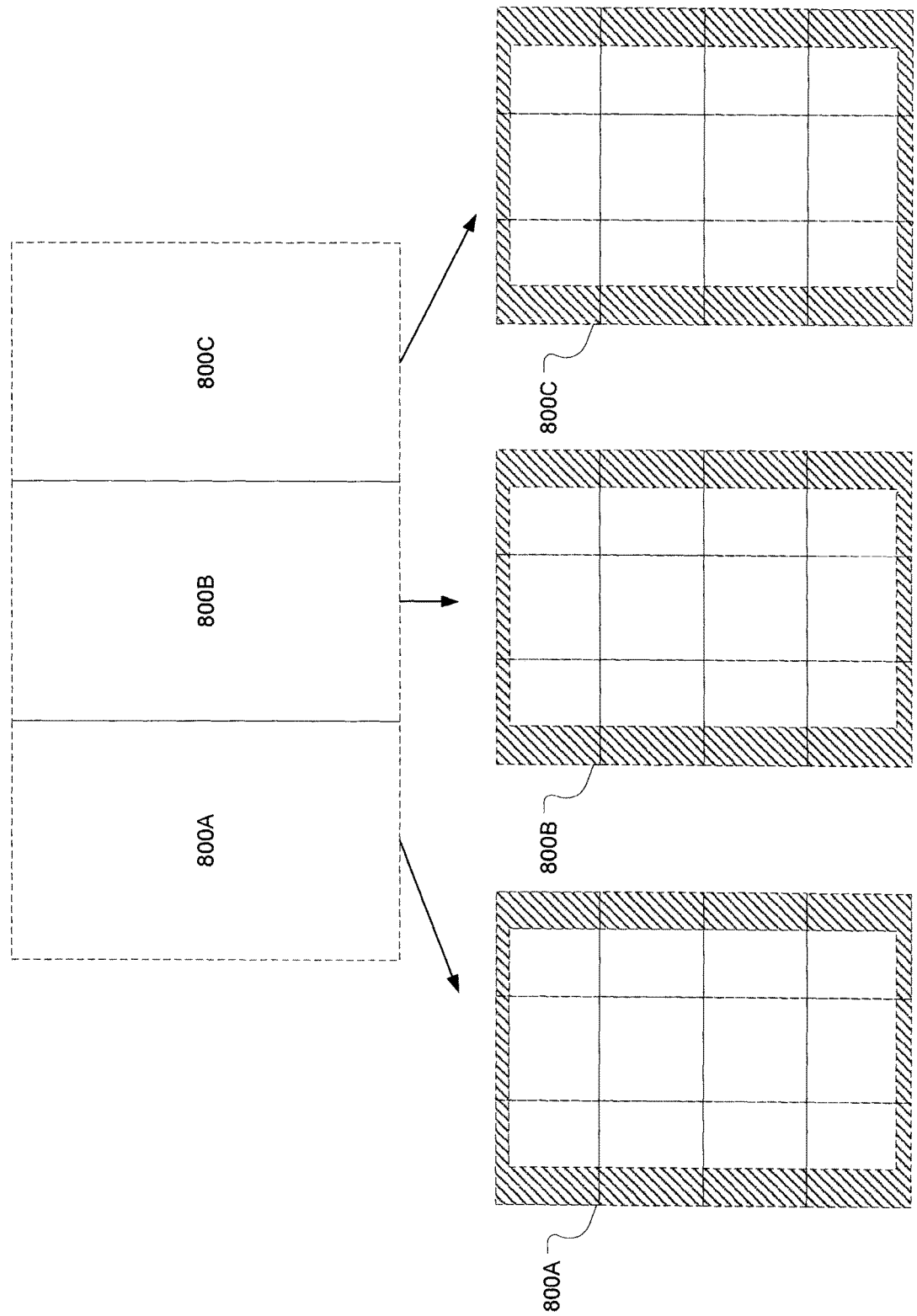

In FIG. 8A, there is shown a source flyer image having three regions 800A, 800B and 800C. Each region is a portion of the source flyer image and each region is segmented into tiles independently from the other regions. In other words, each region on the source flyer image has its own set of flyer image tiles. In the first two embodiments discussed above, the entire source flyer image, having one or more regions, is taken as a single image and segmented into flyer image tiles. During or after segmentation, the region-edge tiles are identified and dealt with as discussed in the first two embodiments. By contrast, in the third embodiment, tiling is carried out on a per-region basis. Any tiles that extend outside of the region (i.e. the shaded portion in FIG. 8B) may be clipped or made transparent such that the portions extending outside of the region do not obstruct the visibility of other tiles. In another embodiment, there may be multiple copies of the source flyer image for each digital flyer, each copy representing a pre-determined resolution of a viewport of the communication device.

While the embodiments have been discussed as distinct implementations, it will be understood that a combination of the embodiments may be used depending on various factors. For example, for simple digital flyers having few versions of the source flyer image, the number of different combinations of abutting regions may be minimal and thus, the first embodiment may be used. However, for digital flyers with many different versions and extensive dynamic flyer content, the second or third embodiment may be implemented. Also, for simplicity, only one zoom level has been discussed for the three embodiments. The same principles discussed in the present disclosure apply equally to other zoom levels such the viewer is able to zoom in and out of the digital flyer using the flyer tiling technology as discussed herein. Furthermore, while the regions in the embodiments discussed are shown to abut, it will be understood that the term "abut" used herein does not require the abutting regions to share an edge as shown in FIGS. 5-8. Rather, "abutting regions" are regions that are immediately adjacent to another without an intermediate region. It will be understood that there may be space in between regions to demarcate the different regions, for example to show the illusions of pages on a digital flyer.

Content Generation and Presentation

As discussed in the present disclosure, the digital flyer according to an embodiment of the present disclosure is created using a source flyer image. The source flyer image may be scanned from a print flyer page-by-page or the source flyer image may be the digital image that was used to print the paper flyer. The source flyer image may also be normalized to conform the source flyer image to a standard format. This may entail applying some form of image processing, such as crop, image alignment, image adjustment and image scaling. Additionally, the source flyer image may be segmented into tiles as described in this disclosure.

The dynamic flyer content may be created in a variety of different ways. In one embodiment, the flyer content generation module 302 may create the dynamic flyer content from a defined region on the source flyer image. This region may be, for example, a portion of one or more pages within the source flyer image provided by the vendor as a PDF or any other format. Alternatively, or additionally, the region may be demarcated using polygon mapping technology as described in commonly owned US patent application Ser. No. 13/011,612 (referred to herein as "commonly owned polygon mapping application"), which is incorporated herein by reference. The defined region is then used to add, delete or otherwise alter the flyer content shown to the viewer of the digital flyer.

Figure 9A:
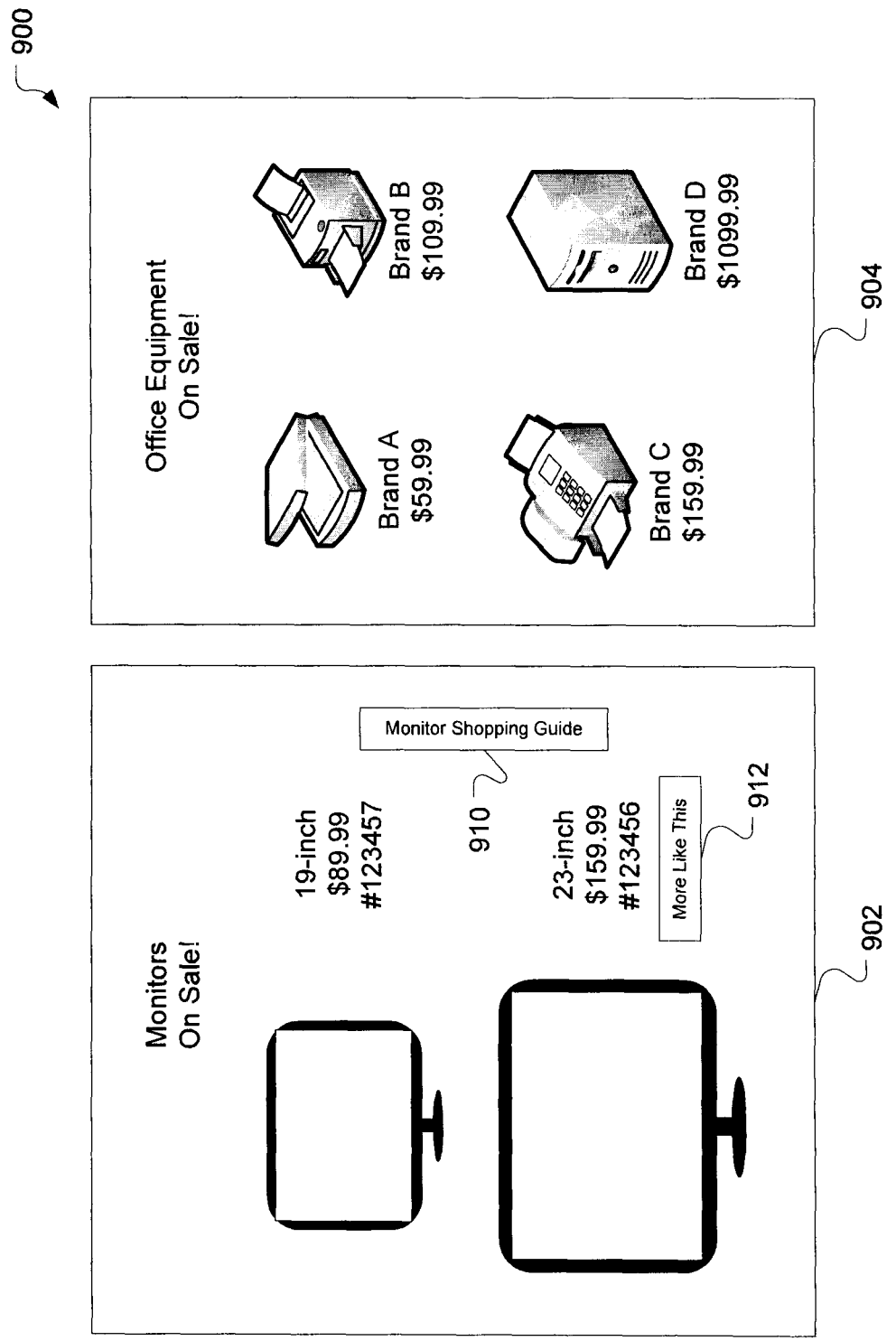
Figure 9B:
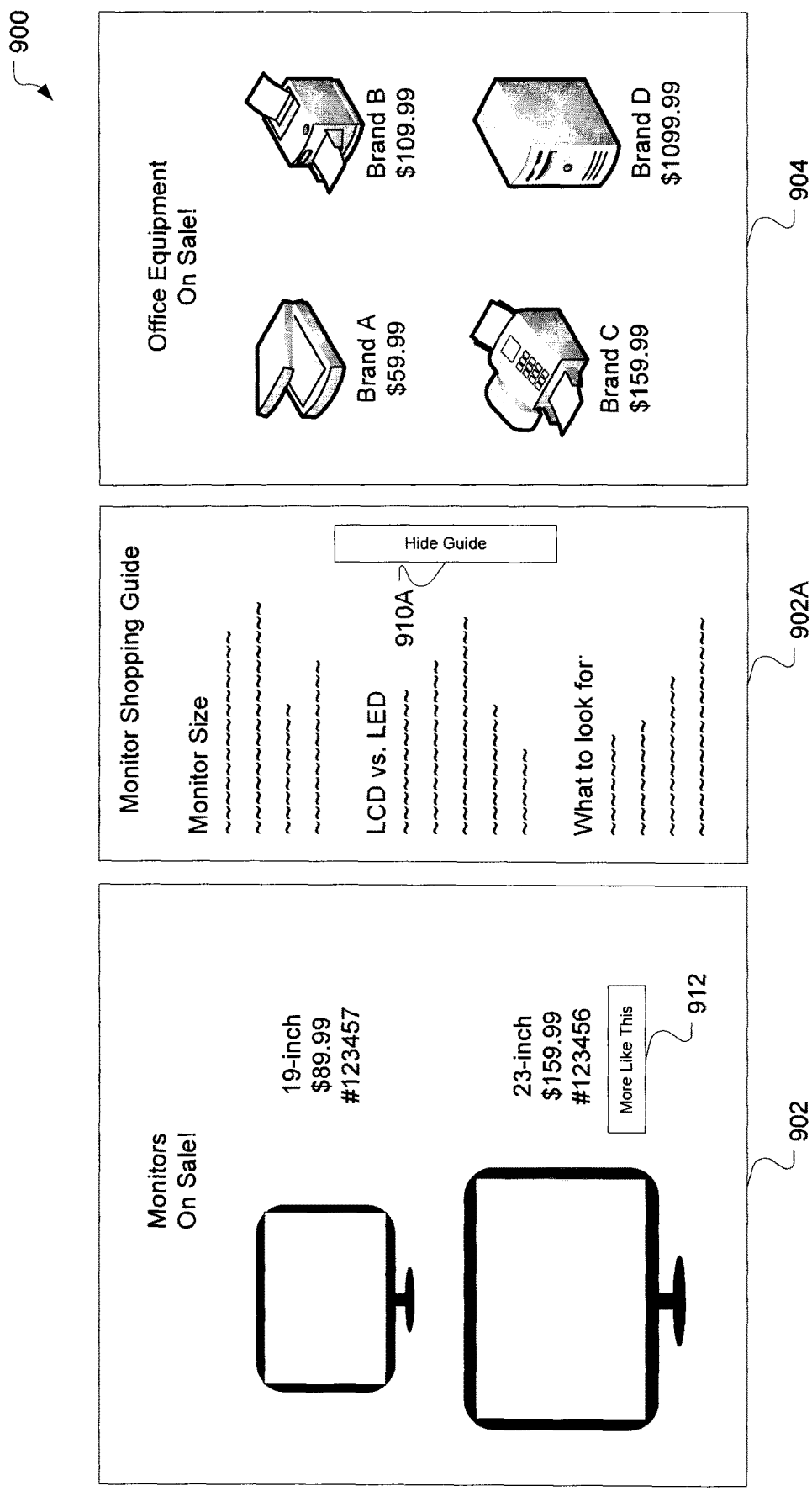

An example is shown using FIGS. 9A and 9B. In FIG. 9B, the digital flyer 900 includes three regions 902, 902A and 904. In one embodiment, the source flyer image for the digital flyer 900 may include all three regions when the source flyer image is communicated to the publisher. The publisher may then define the three regions 902, 902A and 904 according to the process defined in this disclosure. Alternatively, or additionally, the source flyer image for the digital flyer 900 may include the two regions 902 and 904, and the vendor may communicate an additional source flyer image for the region 902A, to be included into the digital flyer 900, and perhaps into other digital flyers. Depending on the actions of the viewer, the region 902A may become visible. By adding, deleting, or swapping the regions of the digital flyer 900 depending on the interactions of the viewer, the flyer content can be dynamically altered. Referring to FIG. 9A, a portion of the digital flyer 900 for an electronic vendor is shown. On flyer region 902, there is shown two monitors on sale. To assist the viewers, there may be included an interface element 910 that may display a shopping guide. In this example, the interface element 910 acts as a trigger to alter the flyer content currently displayed to the viewer to show the shopping guide. The interface element 910 may be associated with a region 902A that may be hidden until the interface element 910 is activated. As shown in FIG. 9B, the region 902A displays the monitor shopping guide as an insert flyer page. The region 902A is shown until the interface element 910A is activated, in which case the region 902A is hidden as shown in FIG. 9A.

Figure 9C:
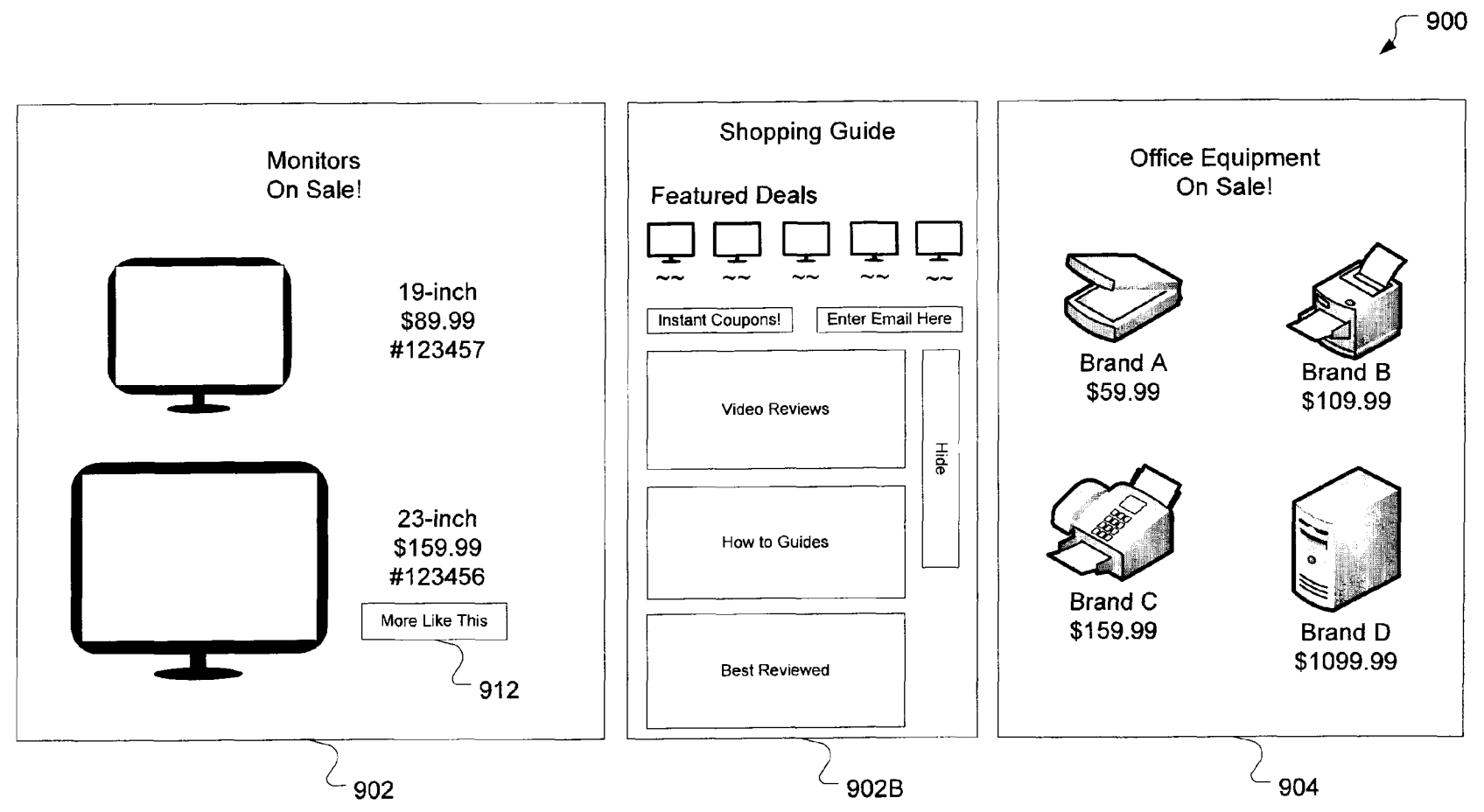

In another embodiment, the dynamic flyer content may be retrieved from an external source and displayed as a region in the digital flyer. The external source may be a database operated by the vendor, which contains related product information, pictures, configurations, recipes and other pertinent information. The information retrieved from the external source may be according to a predefined integration template, which defines the specific information to retrieve from the external source and organize the retrieved information as specified in the predefined integration template. Referring to FIGS. 9A and 9C, upon activating interface element 910, region 902B may become visible as shown in FIG. 9C. While in FIG. 9B, the region 902A may have been provided as part of the source flyer image, region 902B in FIG. 9C may have been generated using a pre-defined template. The pre-defined template may be provided by the vendor and configured to maintain the "look and feel" of the vendor. In the pre-defined template, defined areas in the template may be configured to retrieve other related flyer content from a predefined external source and organize and present the retrieved content as defined in the template. In FIG. 9C, the related flyer content is shown as featured deals related to the items in region 902, coupons, video reviews, how to guides, and best reviews by peers. The pre-defined template may be further configured to collect email addresses of viewers for future communications.

The flyer content generation module 302 may also be configured to retrieve specific information related to a particular item on the digital flyer. For example, the interface element 912 on the digital flyer 900 retrieves flyer content that is related to the associated product. In this example, the interface element 912 refers to retrieving monitors that are similar to the 23-inch monitor. Upon activation of interface element 912, the flyer content generation module 302 receives the unique identifier associated with the interface element 912, which may be the SKU or product ID, from the communication device. Using the unique identifier, the flyer content generation module 302 may retrieve the related information from an external source, such as a product database communicated by the vendor, and integrate the retrieved related information as a region in the digital flyer. In one embodiment, the region may be the rendered output of a pre-defined integration template.

In another embodiment, the digital flyer may also be used to collect information from the viewer. In other words, the digital flyer may be a two-way communication between the viewer and the digital flyer system. For example, the digital flyer may include an email collection interface for the viewers to enter their email addresses. The digital flyer system may then use this email to communicate future information to the viewer. In another example, a pre-defined template may be used to collect information from the viewer of the digital flyer. For example, the pre-defined template may be a contest entry template that collects certain pertinent information from viewers. In a further embodiment, the digital flyer may include an interface or template that allows viewers to unlock a coupon. For example, the interface may be a game of chance that the viewer may interact with to unlock the coupon.

In a further embodiment, the flyer content generation module 302 may be configured to generate flyer content based on loyalty program information. In this embodiment, the flyer content generation module 302 may receive identification information related to the loyalty program. For example, the identification information may be the loyalty program number, which may have been collected through an interface on the communication device. Further, the digital flyer system may store identification information for multiple loyalty programs. In another example, identification information may have been communicated from an external source such as the web service of a vendor. In this example, the viewer may be logged into the vendor's website and the information stored on the vendor's website may be communicated to the digital flyer system. The communication may be achieved through a cookie or a database query, or any other mechanisms. The received identification information is then used to retrieve the profile of the viewer related to the identification information. For example, the profile may be retrieved from the database related to the loyalty program. The profile is then used to generate flyer content. For example, the loyalty program may be a frequent flyer miles program. If the retrieved profile of the viewer indicates that the viewer is a high mileage flyer, the flyer content may tailored for business travellers. In another embodiment, the retrieved profile may be normalized to a standard format prior to generating the flyer content.

Figure 10:
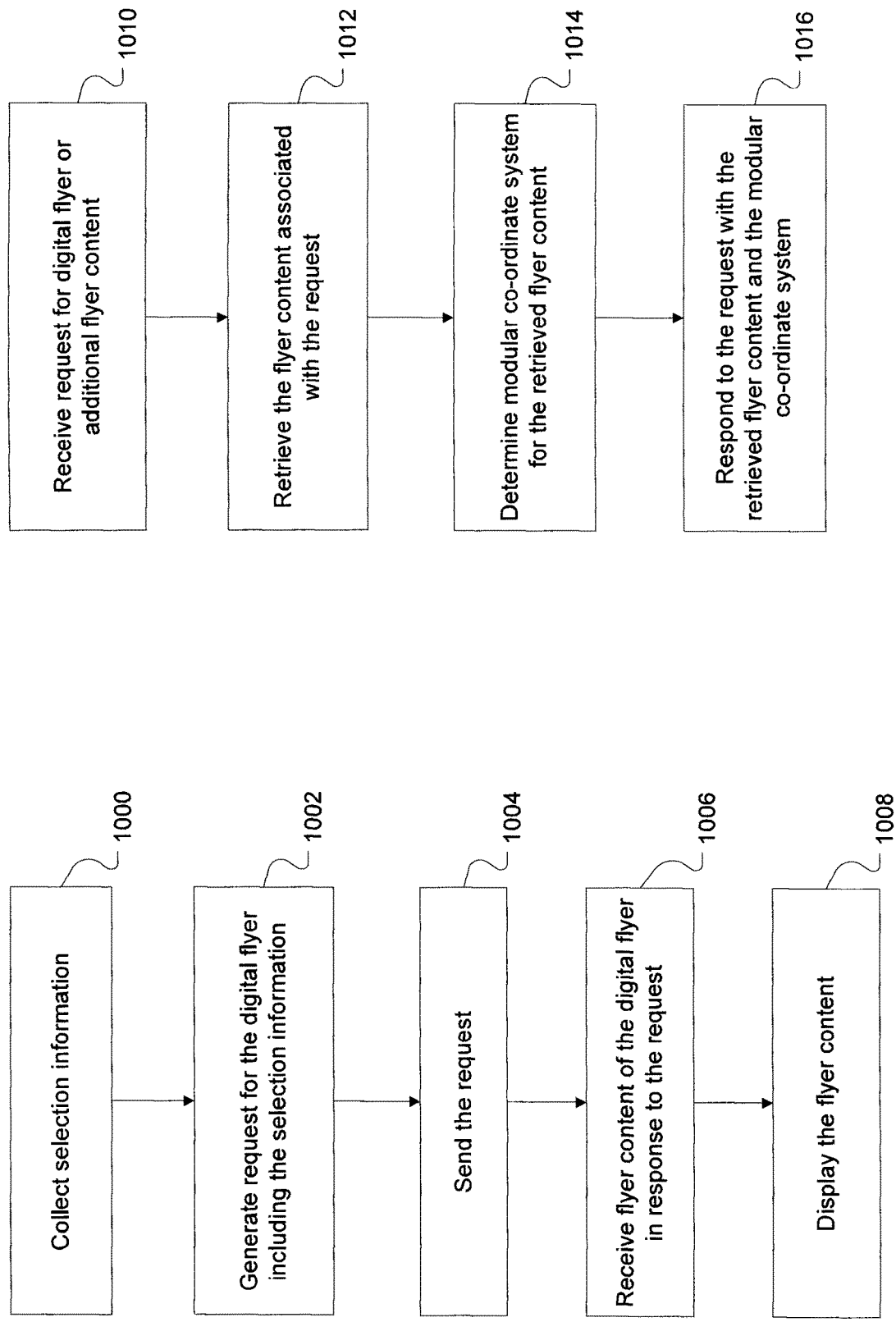
FIG. 10 shows a process for requesting and processing digital flyer according to an embodiment of the present disclosure.

Thus, according to an embodiment of the present disclosure, the communication device collects selection information of a viewer of a digital flyer (i.e. 1000 in FIG. 10). This collection may be performed by the flyer processing module 210 in FIG. 2. In one embodiment, the selection information is a unique identifier. In another embodiment, the selection information is a surrounding circumstance of the viewer such as location information and weather condition. In a further embodiment, the selection information may be the browsing information of the viewer. In an even further embodiment, the selection information may identification information for a loyalty program. The flyer processing module 210 may then generate the request for the digital flyer including the selection information collected (i.e. 1002 in FIG. 10). The generated request is sent to a server, for example, using the communication module 206 in FIG. 2. The server may implement the digital flyer system 300 as shown in FIG. 3.

The digital flyer system receives the request for the digital flyer, with the request including selection information. Additionally, in subsequent request from the communication device, the digital flyer system may receive request for additional flyer content (i.e. 1010 in FIG. 10). Flyer content for the digital flyer is then retrieved (i.e. 1012 in FIG. 10). In one embodiment, where the selection information is a unique identifier, the flyer content generation module 302 retrieves flyer content associated with the unique identifier from an external source. Further, the retrieved related information from the external source may be retrieved according to a pre-defined integration template. For example, the external source may be a product database. In another example, the external source may be the vendor's website that may be harvested and indexed. In another embodiment, where the selection information is the surrounding circumstance of the viewer, the flyer content generation module 302 may retrieve the flyer content corresponding to the surrounding circumstance. For example, the surrounding circumstance may be location information of the viewer and the flyer content generation module 302 may replace the appropriate regions of the digital flyer that corresponds to the viewer's location. In a further embodiment, where the selection information is the browsing behaviour of the viewer, the flyer content generation module 302 may assign the viewer into one or more of the pre-defined viewer profiles. The modular co-ordinate system for the retrieved flyer content is determined (i.e. 1014 in FIG. 10). This may involve creating the modular co-ordinate system for the flyer content or updating the modular co-ordinate system in view of the modified flyer content on the digital flyer. The digital flyer system then responds to the request for the flyer content with the retrieve flyer content and the modular co-ordinate system (i.e. 1016 in FIG. 10). The communication device receives the flyer content and the flyer content is displayed using the flyer display module 212.

While the unique identifier present in a region of the digital flyer may be manually inputted, the identification of the unique identifier in a region of the digital flyer may be automated. As described in the present disclosure, the region may be defined using polygon mapping technology as described in the commonly owned polygon mapping application. The use of the polygon mapping technology may be useful in defining a portion of a page of the source flyer image as a region. Alternatively, or additionally, each region may correspond to one or more pages of the digital flyer. For example, the source flyer image for the digital flyer may be provided in PDF format, with each page of the PDF file representing a page of the digital flyer. The digital flyer system may define each page of the PDF file as a region.

In a further embodiment, image comparison may be used to determine the different regions of the source flyer image.

In this embodiment, multiple versions of the source flyer image may be provided with each version representing a particular view of the digital flyer to be shown under specific conditions. For example, the different versions of the digital flyer may be targeted to different geographic regions or different demographics. Referring to FIGS. 11A and 11B, there is shown two versions of the source flyer image for the digital flyer 1100. To determine the different regions on the source flyer image, the digital flyer system may compare the different versions of the source flyer image and identify the differences between the two versions. This may be achieved by down-scaling the resolution of the source flyer image. Since the source flyer image is often in high-resolution, the flyer content generation module 302 may down-scale the source flyer image prior to identifying the differences between the different versions of the source flyer image. Moreover, the level of down-scaling may be varied depending on the resource consumption and the precision required for the source flyer image. For example, the precision required may be determined based on the density of the source flyer image. The down-scaled source flyer image is then compared to determine the areas on the source flyer image that differs between the different versions of the source flyer image. In FIGS. 11A and 11B, the flyer content generation module 302 would identify that while area 1102 remains the same between the two versions of the digital flyer 1100, areas 1104A and 1104B differ between the two versions of the source flyer image. Thus, the flyer content generation module 302 would define the regions such that they would coincide with the regions 1102, 1104A and 1104B as shown in FIGS. 11A and 11B. Additionally, the identification of the difference between the different versions may be supplemented by comparing the content within those areas. For example, if the identified area contains nominal change, such as a shift in content or minor cosmetic difference, then the difference may be ignored.

After the regions are defined, the digital flyer system generates a modular co-ordinate system for the digital flyer. Additionally, the flyer content generation module 302 may extract all characters within each region. For example, the extraction process may involve using known OCR process. The extracted characters are then analyzed using predefined rules to determine the existence of a unique identifier. For example, the predefined rules may define that the "$" character followed by a set of numbers is likely a price. In another example, the predefined rules may define that "#" character followed by a set of numbers that fit a particular format as communicated by the vendor may be the SKU or product ID. The unique identifiers are then used as described in this present disclosure.

Figure 12:
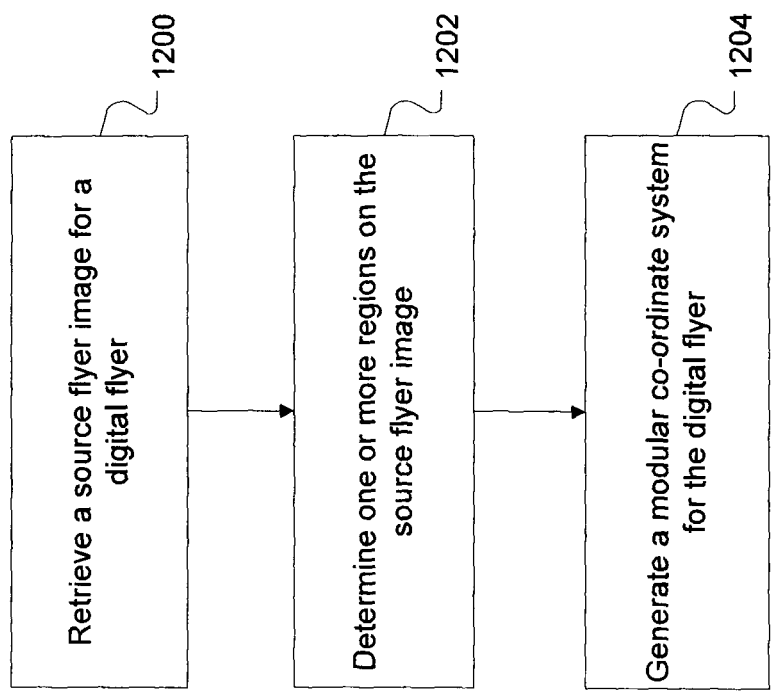
FIG. 12 shows a process for generating digital flyer content according to an embodiment of the present disclosure.

Thus, digital flyer content having dynamic flyer content according to an embodiment of the present disclosure is generated by retrieving a source flyer image for the digital flyer (i.e. 1200 in FIG. 12). For clarity, it will be understood the "a" refers to both singular and plural forms. The source flyer image is then analyzed to determine one or more regions on the source flyer image (i.e. 1202 in FIG. 12). The modular co-ordinate system for the digital flyer is then generated (i.e. 1204 in FIG. 12). In one embodiment, the characters within each region may be extracted to identify a unique identifier.

Flyer Content Display

As discussed in the present disclosure, the digital flyer system utilizes a source flyer image to preserve the creative elements of the print flyer. Thus, the digital flyer discussed in the present disclosure is an image-based digital flyer, where one or more regions are defined on the source flyer image, which may be added, deleted or otherwise changed to alter the flyer content. The request to retrieve dynamic flyer content may have been associated with an interface element such as 910 in FIG. 9A or other selection mutation as it will be described below. However, the digital flyer may have several interface elements such that when taken together, there may be a large number of possible content. For example, suppose that the flyer content includes a user-customizable sofa where the user can customize three different types of colours, four different types of seating configurations and five add-on features. The resulting permutations of the possible flyer content is 3×4×5=60 different sofa configurations. The sofa configurator may be, for example, an HTML or Flash™ component. While all dynamic flyer content discussed in this present disclosure are "interact-able" (e.g. zoom, pan, and links), such flyer content having a large number of permutations may be referred herein as "interactive flyer content".

Figure 13A:
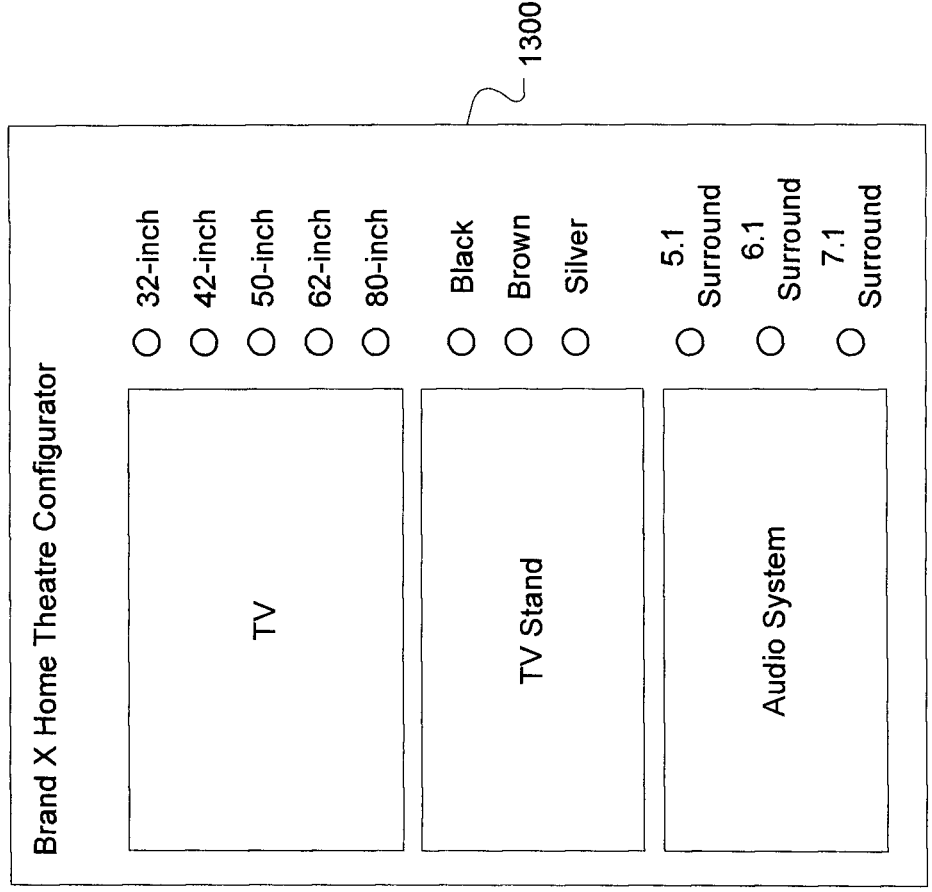
FIGS. 13A-13C illustrate how the digital flyer system inserts interactive flyer content according to an embodiment of the present disclosure.
Figure 13B:
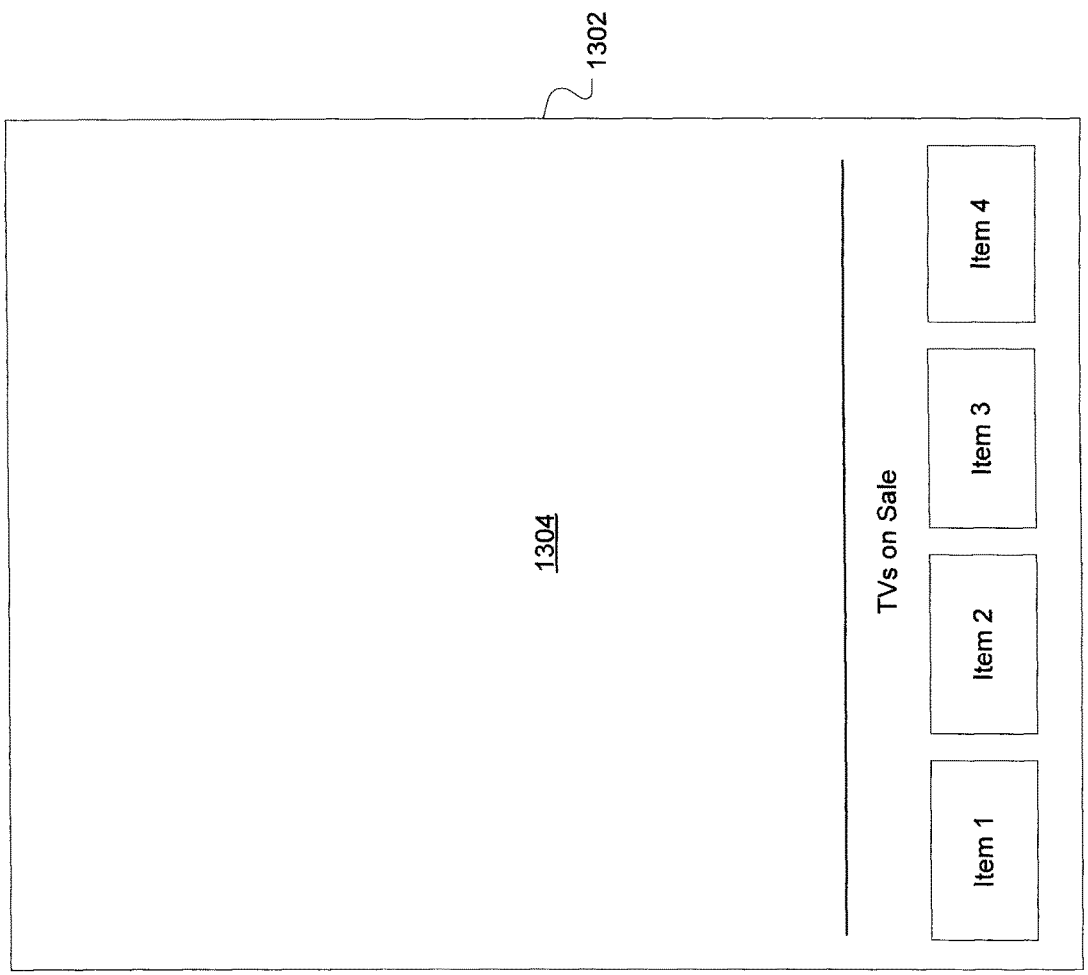

For such interactive flyer content, while the different permutations may be pre-rendered and configured to be shown on the digital flyer, in one embodiment of the present disclosure, the interactive flyer content is embedded into a region of the source flyer image without pre-rendering the different permutations. Referring to FIG. 13A, interactive flyer content 1300 is a home theatre configurator. The configurator contains 5 different configurations of TVs, 3 different configurations of TV stands and 3 different configurations of audio systems for a total of 45 different permutations of the home theatre package. FIG. 13B shows a region 1302 on a source flyer image, having an area 1304 where the interactive flyer content 1300 may be integrated. The source flyer image on which the region 1302 belongs may be segmented into tiles as discussed in the present disclosure.

Figure 13C:
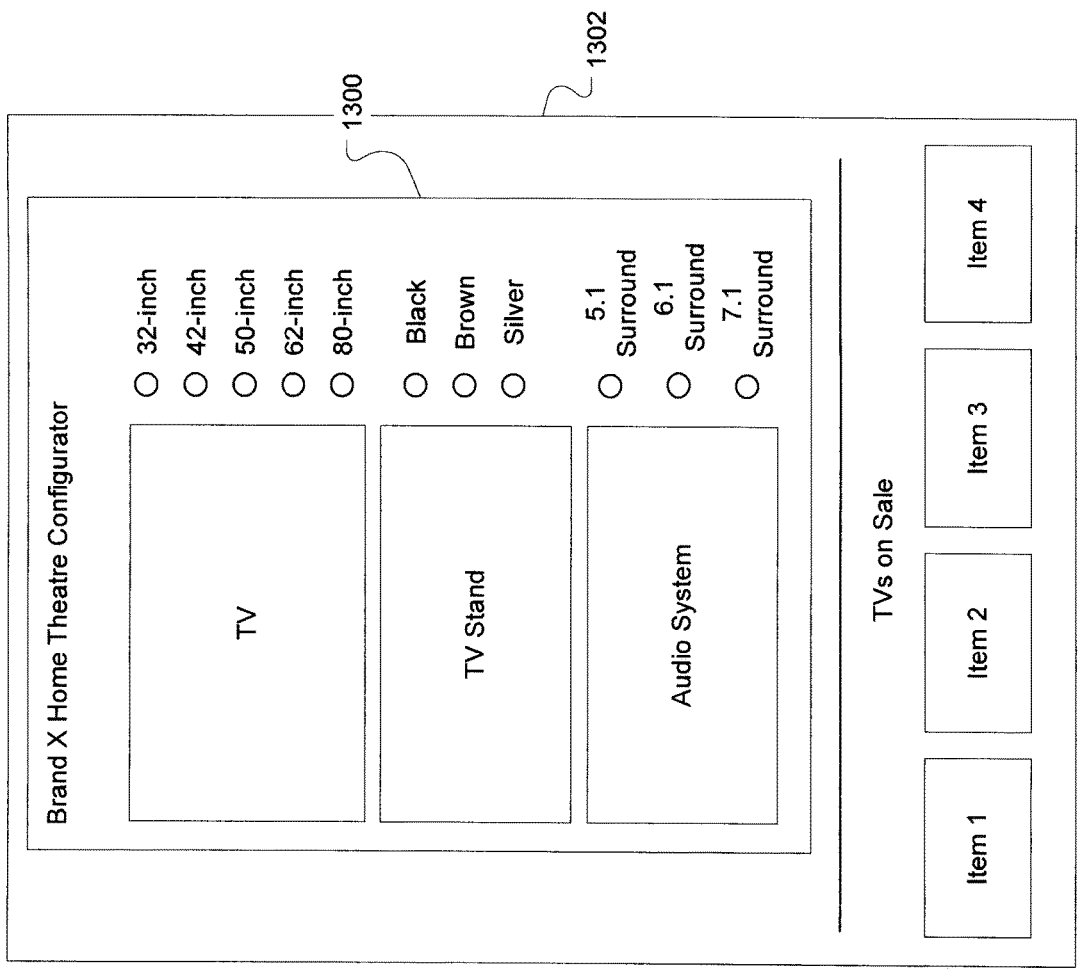

In one embodiment, rather than pre-rendering all 45 different permutations of the home theatre package, the home theatre configurator may be embedded into the area 1304 of region 1302, as shown in FIG. 13C, such that the configurator (i.e. the interactive content) inherits the modular co-ordinate system of the region 1302. This allows the embedded interactive content to pan in concert with the rest of the flyer content (such as the "TVs on Sale" shown in FIG. 13C) and also adjust when other regions of the digital flyer are added, deleted or otherwise altered.

Zooming is also achieved by varying the level of details at each zoom level. For image-based flyer content, zooming may be provided by the copies of the tiled source flyer image at each level of zoom as discussed in the commonly owned flyer image tiling application. However, since embedded interactive contents are not tiled, except when pre-rendered as it will be discussed below, zooming is made possible by scaling the interactive flyer content and varying the level of details at various zoom levels. For example, the interactive flyer content may be HTML content containing text, pictures, and tables. The flyer content generation module 302 may analyze the interactive flyer content and identify the elements to be included at each zoom level. The flyer content generation module 302 may then assign the identified elements to each of the available zoom level. An example is provided in the table below.

| Zoom Level | Elements Shown |
|---|---|
| 5 | Text with large fonts<br>Pictures scaled up<br>Tables with large fonts |

-continued

| Zoom Level | Elements Shown |
|---|---|
| 4 | Text with regular fonts |
| | Pictures |
| | Tables with regular fonts |
| 3 | Text with small fonts |
| | Pictures scaled down |
| | Tables with small fonts |
| 2 | Pictures and Tables |
| 1 | Pictures |

Thus, as the viewer zooms in and out of the interactive flyer content, the viewer is presented with meaningful content.

In another embodiment, the flyer content generation module 302 may render the interactive flyer content on-demand and store the rendered interactive flyer content in memory for retrieval. In this embodiment, the pre-rendered interactive flyer content may be segmented into tiles using the flyer tiling module 308 and stored in the flyer tile store 310. For the pre-rendered interactive flyer content, any subsequent requests for the interactive flyer content would be retrieved from the memory while interactive flyer content not in the memory would be rendered on-demand. Additionally, the flyer content generation module 302 may pre-render a subset of the possible permutations depending on various factors to decrease the processing time. For example, the digital flyer system may include a feedback system, such as the feedback system disclosed in the commonly owned flyer image tiling application, and based on the feedback data from such feedback system, pre-render the permutations most likely to be retrieved by viewers. By pre-rendering the interactive flyer content that majority of viewers access, the digital flyer system is able to decrease the processing time required to render interactive flyer content on-demand.

Figure 14:
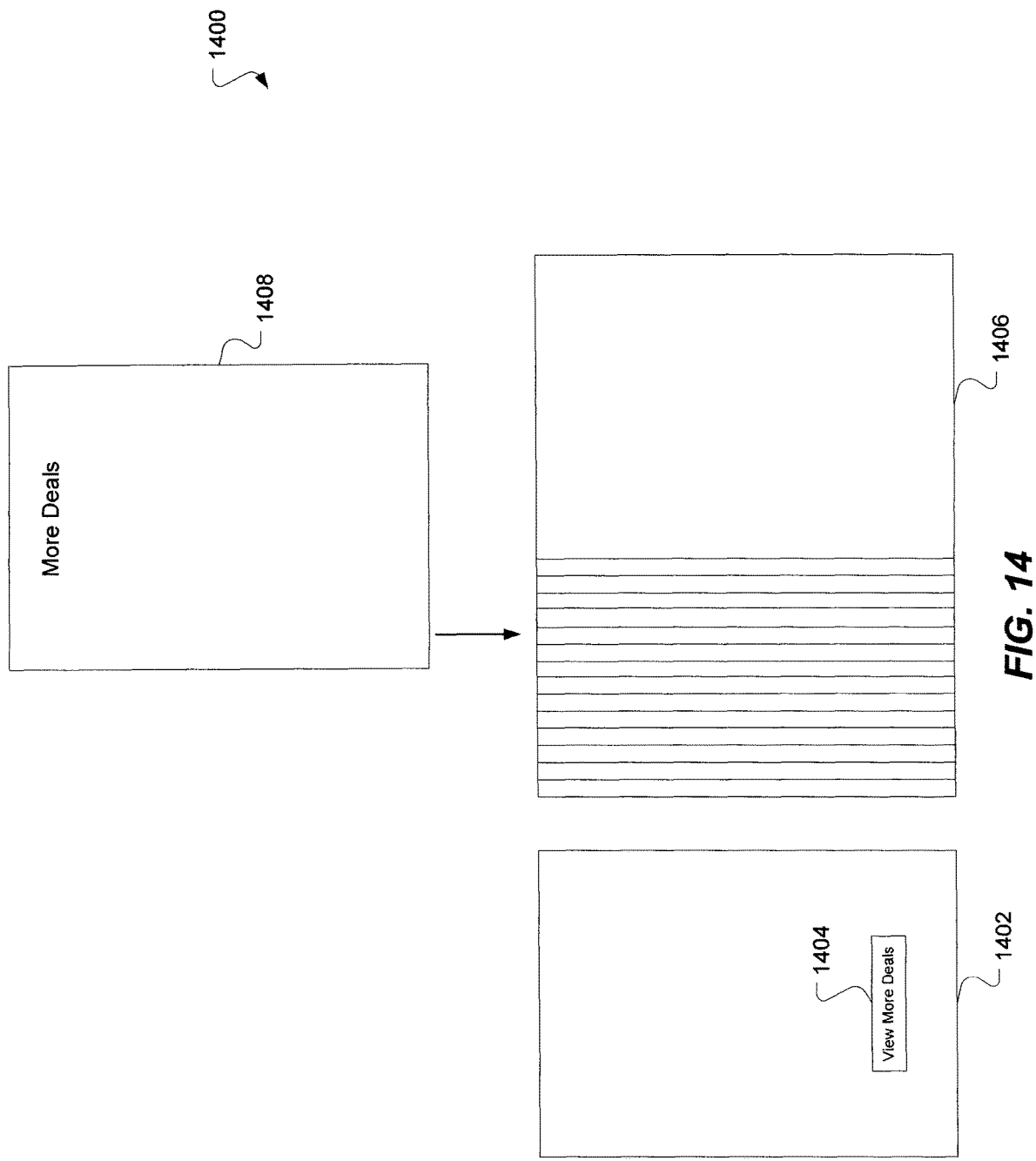
FIG. 14 illustrates a pre-fetching process according to an embodiment of the present disclosure.

Since dynamic flyer content such as videos and pre-rendered interactive flyer content may be significant in file sizes, the communication device for displaying the digital flyer according to the present disclosure may include a pre-fetching module 214. While tiled source flyer image may incorporate the pre-fetching process as outlined in the commonly owned U.S. patent application Ser. No. 13/299,528 (referred herein as "commonly owned pre-loading application"), the pre-fetching module 214 prioritizes the loading of flyer content based on the layout of the flyer content. Since browsing a digital flyer with dynamic flyer content may not be necessarily "linear" (e.g. viewer may retrieve additional content, may jump to another section of the digital flyer), the pre-fetching module 214 may assign a priority score to each region on the digital flyer. The priority score may be based on the linear browsing distance from the region currently being viewed in the viewport. The farther the linear browsing distance, the priority score for retrieving such flyer content would be lower. Additionally, the priority score may consider the interactive elements present in each region. Such interactive elements may deviate the viewer from browsing "linearly". Referring to FIG. 14, a digital flyer 1400 is shown to a plurality of regions. If the digital flyer 1400 was browsed "linearly", the viewer would start from region 1402 and end at region 1406. However, according to an embodiment of the present disclosure, the region 1402 may include an interface element 1404 that may trigger the retrieval of new region 1408 that may be inserted into the digital flyer 1400. Thus, in this embodiment, the pre-fetching module 214 may assign a higher priority score to region 1408. In a further embodiment, the pre-fetching module may use feedback information from a feedback system, such as the one disclosed in the commonly owned flyer image tiling application, to assign a priority score based on the feedback information.

Content Selection

Digital flyer content according to the embodiments in the present disclosure is selected based on selection information. Based on the selection information, the flyer content generation module 302 generates (e.g. using predefined integration template) or retrieves (e.g. the region of the source flyer image) the appropriate flyer content.

In one embodiment, the selection information may be a unique identifier associated with a user interface element such as user interface element 910 and 912 in FIG. 9A. The user interface element may be a portion of the source flyer image, contextualized through polygon mapping, or embedded into the source flyer image, with which viewers of the digital flyer would interact using actions such as "clicking" or "tapping". Upon activation of the user interface element, the flyer content would be altered based on the associated action. In one embodiment, the associated action may be the addition, deletion or substitution of one or more regions. In another embodiment, the associated action may be the activation of interactive flyer content such as videos.

In another embodiment, the selection information may be the surrounding circumstances of the viewer. For example, the surrounding circumstance may be the viewer's geographic location obtained through such means as IP address, Wi-Fi, GPS and other technologies. Another example may be the weather conditions in the city in which the viewer may be located. The surrounding circumstances may then be used to, for example, display different versions of the digital flyer.

In a further embodiment, the selection information may the viewer's digital flyer browsing information. Flyer browsing information may include information about the communication device on which the viewer is viewing the digital flyer such as viewport size, operating system version, browser version, and information regarding the viewing pattern of the viewer such as the type of content viewed by the viewer and the time at which the content was accessed. Other information, such as feedback information discussed in the commonly owned flyer image tiling application, may be collected. Such information may be aggregated on a per session basis or on a per viewer basis if there is a unique identifier that can be associated with the viewer. In one embodiment, to determine the viewer pattern, digital flyer may be contextualized using polygon mapping technology as described in the commonly owned polygon mapping application. By determining which polygon is shown in the viewport of the communication device, the digital flyer system is able to determine what type of flyer content the viewer is interested in.

Using this selection information, the digital flyer system may categorize the viewer into one or more of the pre-defined viewer profiles. Each pre-defined viewer profile may be associated with a particular dynamic flyer content and the appropriate flyer content may be shown to the viewer. For example, the flyer content generation module 302 may determine that the viewer is biased toward browsing through heavily discounted items. In this example, the digital flyer system may categorize the viewer into a "bargain seeker group" and alter the digital flyer content appropriately.

Additionally, using the digital flyer system according to the present disclosure, the vendor is able to conduct experiments on variations of the digital flyer content. This allows the vendor to vary the digital flyer content so as to determine the most effective and desired flyer content. Such experiment may be herein referred to as "multi-variate testing". In one embodiment, the different versions of the digital flyer may be randomly displayed to the viewer. The communication device (such as the flyer processing module 210) may collect such viewer-related information and communicate this information to the digital flyer system. The digital flyer system may then associate the viewer-related information with the particular version of the digital flyer that was displayed to the viewer. Based on the information collected, a grade may be determined for each version of the digital flyer and the underperforming digital flyer may be removed from the available list of flyer versions. Alternatively, the underperforming digital flyer may be shown less often. In another embodiment, the different versions of the digital flyer may be assigned a weight, which may be varied as the results of the multi-variate testing are obtained. As the weight for each digital flyer is updated, digital flyers having greater weight may be shown more frequently than digital flyer having lower weight. In a further embodiment, the experiment may be associated with an engagement event, with the engagement event configured to activate the start of the experiment. For example, the experiment may involve how the organization of TV content affects the level of interaction from the viewer. However, in order to ensure that the experiment is performed on the appropriate viewer, information of the viewer may only be counted toward the experiment if the viewer engages at least one TV item, which may be defined as the engagement event. Upon engaging at least one TV item, the digital flyer system may determine that the viewer is someone in the market for TV and begin collecting information about the viewer. This ensures that experimental data is collected from the most pertinent viewers.

While the patent disclosure is described in conjunction with the specific embodiments, it will be understood that it is not intended to limit the patent disclosure to the described embodiments. On the contrary, it is intended to cover alternatives, combinations, modifications, and equivalents as may be included within the scope of the patent disclosure as defined by the appended claims. In the description below, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

It is further understood that the use of relational terms such as first and second, and the like, if any, are used solely to distinguish one from another entity, item, or action without necessarily requiring or implying any actual such relationship or order between such entities, items or actions.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some portions of the detailed description in the above are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the above discussions, it is appreciated that throughout the specification discussions utilizing terms such as "processing," "computing," "calculating," "determining," or the like, refer to the action and/or processes of a computer or computing system, or similar electronic computing media player device, that manipulate and/or transform data represented as physical, such as electronic, quantities within the computing system's registers and/or memories into other data similarly represented as physical quantities within the computing system's memories, registers or other such information storage, transmit session or display devices.

Embodiments within the scope of the present disclosure can be implemented in digital electronic circuitry, or in computer hardware, firmware, software, or in combinations thereof. Apparatus within the scope of the present disclosure can be implemented in a computer program product tangibly embodied in a machine-readable storage medium for execution by a programmable processor; and method actions within the scope of the present disclosure can be performed by a programmable processor executing a program of instructions to perform functions of the present disclosure by operating on input data and generating output. Embodiments within the scope of the present disclosure may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). It should be understood that embodiments of the present disclosure may be used in a variety of applications. Although the present disclosure is not limited in this respect, the methods disclosed herein may be used in many apparatuses such as in the transmitters, receivers and transceivers of a radio system. Radio systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDA's), notebook computers in wireless local area networks (WLAN), wireless metropolitan area networks (WMAN), wireless wide area networks (WWAN), or wireless personal area networks (WPAN, and the like).

What is claimed is:

1. A system for displaying an image-based digital flyer having dynamic flyer content on a communication device, the system comprising:
   a processor; and
   a non-transitory computer-readable memory comprising computer-executable instructions, which when executed by the processor configure the system to:
   collect at the communication device selection information of a viewer of the digital flyer;
   generate a request for the digital flyer, the request including the selection information;
   send the request for the digital flyer to a server;
   receive the digital flyer, the digital flyer comprising:
      a modular co-ordinate system comprising local co-ordinate systems for each of a plurality of regions of the digital flyer and a root co-ordinate system providing root offset values for positions of each of the plurality of regions, the local co-ordinate systems used to reference points within the respective regions;
      a source flyer image at least partially displayable within one or more of the plurality of regions of the digital flyer; and
      dynamic flyer content received from the server in response to the request, the dynamic flyer content selected based on the selection information;
   display at least a portion of the flyer content received from the server in a display of the communication device, wherein the flyer content is displayed in one or more of the plurality of regions in accordance with the root offset values of the regions in the modular co-ordinate system, and wherein at least one displayed region comprises an interface element;
   detect viewer interaction with the interface element corresponding to activation of a trigger within the displayed flyer content; and
   dynamically, in response to the trigger activation:
      modify the position of one or more of the plurality of regions relative to each other;
      update the root offset values of the root co-ordinate system, the updated root offset values reflecting the updated positions of the plurality of regions, wherein the updated root offset values are used to convert referenced points in the local coordinate systems of respective regions to the root co-ordinate system without having to update the referenced points within the local coordinate systems;
      display an updated portion of the flyer content in one or more of the plurality of regions in accordance with the updated root offset values; and
      convert points regions specified in the respective local coordinate systems to the root coordinate system using the root offset values of the respective regions.

2. The system according to claim 1, wherein the source flyer image comprises a tile set including one or more copies of the source flyer image segmented into tiles, each copy representing a zoom level of the digital flyer.

3. The system according to claim 2, wherein region-edge tiles of the source flyer image are shared between abutting regions, and the tile set comprises every permutations of the region-edge tiles for the abutting regions in the source flyer image.

4. The system according to claim 2, wherein region-edge tiles of the source flyer image are not shared between abutting regions, and the region-edge tiles outside of the associated region are rendered transparent.

5. The system according to claim 1, wherein the source flyer image comprises a tile set for each region of the source flyer image, each tile set including one or more copies of the region segmented into tiles, each copy representing a zoom level of the region.

6. The system according to claim 1, wherein the system is further configured to: assign a priority score to each region on the source flyer image, the priority score being used to prioritize the pre-loading of each region.

7. The system according to claim 1, wherein the selection information is a unique identifier, a surrounding circumstance of the viewer, browsing information of the viewer or an identification information for a loyalty program or a combination thereof.

8. The system according to claim 1, wherein the system is further configured to: hide one of the one or more regions of the source flyer image, and display the hidden one of the one or more regions of the source flyer image in response to the trigger being activated.

9. The system according to claim 1, wherein the system is further configured to: send a request for additional flyer content to the server and incorporate the additional flyer content received from the server into the digital flyer.

10. The system according to claim 9, wherein the system is further configured to: incorporate the additional flyer content received from the server into the digital flyer by organizing the additional flyer content based on a pre-defined integration template, and incorporating the additional flyer content into one of the plurality of regions of the digital flyer.

11. The system according to claim 9, wherein the system is further configured to: incorporate the additional flyer content received from the server into the digital flyer by organizing the additional flyer content based on a pre-defined integration template, and incorporating the additional flyer content as a new region of the digital flyer.

12. The system according to claim 9, wherein the additional flyer content is a rendered flyer image and the system is further configured to incorporate the additional flyer content received from the server into the digital flyer by incorporating the additional flyer content into one of the one or more regions of the digital flyer.

13. The system according to claim 9, wherein the additional flyer content is a rendered flyer image and the system is further configured to incorporate the additional flyer content received from the server into the digital flyer by incorporating the additional flyer content as a new region of the digital flyer.

14. A method of displaying an image-based digital flyer having dynamic flyer content, the method executed on a processor of a communication device, the method comprising:
   collecting at the communication device selection information of a viewer of the digital flyer;
   generating a request for the digital flyer, the request including the selection information;
   sending the request for the digital flyer to a server;
   receiving the digital flyer, the digital flyer comprising:
      a modular co-ordinate system comprising local co-ordinate systems for each of a plurality of regions of the digital flyer and a root co-ordinate system providing root offset values for positions of each of the plurality of regions, the local co-ordinate systems used to reference points within the respective regions;
      a source flyer image at least partially displayable within one or more of the plurality of regions of the digital flyer; and
      dynamic flyer content received from the server in response to the request, the dynamic flyer content selected based on the selection information;
   displaying at least a portion of the flyer content received from the server in a display of the communication device, wherein the flyer content is displayed in one or more of the plurality of regions in accordance with the root offset values of the regions in the modular co-ordinate system, and wherein at least one displayed region comprises an interface element;
   detecting viewer interaction with the interface element corresponding to activation of a trigger within the displayed flyer content;
   dynamically, in response to the trigger activation:
      modifying the position of one or more of the plurality of regions relative to each other;
         updating the root offset values of the root co-ordinate system to reflect the updated positions of the plurality of regions, wherein the updated root offset values are used to convert referenced points in the local coordinate systems of respective regions to the root co-ordinate system without having to update the referenced points within the local coordinate systems;
      displaying an updated portion of the flyer content in one or more of the plurality of regions in accordance with the updated root offset values; and
   convert points regions specified in the respective local coordinate systems to the root coordinate system using the root offset values of the respective regions.

15. The method according to claim 14, wherein the source flyer image comprises a tile set including one or more copies of the source flyer image segmented into tiles, each copy representing a zoom level of the digital flyer.

16. The method according to claim 15, wherein region-edge tiles of the source flyer image are shared between abutting regions, and the tile set comprises every permutations of the region-edge tiles for the abutting regions in the source flyer image.

17. The method according to claim 15, wherein region-edge tiles of the source flyer image are not shared between abutting regions, and the region-edge tiles outside of the associated region are rendered transparent.

18. The method according to claim 14, further comprising:
   hiding one of the one or more regions of the source flyer image; and
   displaying the hidden one of the one or more regions of the source flyer image in response to the trigger being activated.

19. The method according to claim 14, further comprising:
   sending a request for additional flyer content to the server; and
   incorporating the additional flyer content received from the server into the digital flyer.

20. The method according to claim 19, wherein incorporating the additional flyer content received from the server into the digital flyer comprises:
   organizing the additional flyer content based on a pre-defined integration template; and
   incorporating the additional flyer content into one of the plurality of regions of the digital flyer.

21. The method according to claim 19, wherein incorporating the additional flyer content received from the server into the digital flyer comprises:
   organizing the additional flyer content based on a pre-defined integration template; and
   incorporating the additional flyer content as a new region of the digital flyer.

22. The method according to claim 19, wherein the additional flyer content is a rendered flyer image and incorporating the additional flyer content received from the server into the digital flyer comprises incorporating the additional flyer content into one of the one or more regions of the digital flyer.

23. The method according to claim 19, wherein the additional flyer content is a rendered flyer image and incorporating the additional flyer content received from the server into the digital flyer comprises incorporating the additional flyer content as a new region of the digital flyer.

24. A method of generating dynamic flyer content of an image-based digital flyer on a communication device, the method comprising:
   sending a request for the digital flyer to a server, the request including selection information collected from a viewer on the communication device, the image-based digital flyer comprising a modular co-ordinate system comprising local co-ordinate systems for each of a plurality of regions of the image-based digital flyer and a root co-ordinate system providing root offset values for positions of each of the plurality of regions, the local co-ordinate systems used to reference points within the respective regions;
   receiving the dynamic flyer content for the digital flyer from the server, the dynamic flyer content being retrieved based on the selection information;
   displaying at least a portion of the dynamic flyer content on a viewport of the communication device, the dynamic flyer content organized based on a pre-defined integration template associated with the selected digital flyer, the dynamic content displayed within one or more of the plurality of regions in accordance with the root offset values of the regions in the modular co-ordinate system, and wherein at least one displayed region comprises an interface element;

updating the root offset values of the root co-ordinate to reflect the updated positions of the plurality of regions relative to each other, wherein the updated root offset values are used to convert referenced points in the local coordinate systems of respective regions to the root co-ordinate system without having to update the referenced points within the local coordinate systems;

displaying an updated portion of the flyer content in one or more of the plurality of regions in accordance with the updated root offset values; and converting points regions specified in the respective local coordinate systems to the root coordinate system using the root offset values of the respective regions.

25. The method according to claim 24, wherein the digital flyer comprises a source flyer image for the dynamic flyer content, the source flyer image having one or more regions.

26. The method according to claim 25, wherein displaying the dynamic flyer content on a viewport of the communication device comprises using the offset values of regions in the modular co-ordinate system to display the dynamic flyer content on the viewport of the communication device.

27. The method according to claim 24, wherein the dynamic flyer content is retrieved from an external source using the selection information.

28. The method according to claim 24, wherein the selection information comprises a unique identifier, a surrounding circumstance of the viewer, browsing information of the viewer or an identification information for a loyalty program or a combination thereof.

29. The method according to claim 24, further comprising categorizing the viewer into one or more pre-defined viewer profiles.

30. The method according to claim 29, wherein the dynamic flyer content are organized based on the pre-defined integration template associated with the selected digital flyer and the one or more pre-defined viewer profiles.

31. A system for generating dynamic flyer content of a digital flyer on a communication device, the system comprising:
 a processor; and
 a non-transitory computer-readable memory comprising computer-executable instructions, which when executed by the processor configure the system to:
  send a request for the digital flyer to a server, the request including selection information collected from a viewer on the communication device, the image-based digital flyer comprising a modular co-ordinate system comprising local co-ordinate systems for each of a plurality of regions of the image-based digital flyer and a root co-ordinate system providing root offset values for positions of each of the plurality of regions, the local co-ordinate systems used to reference points within the respective regions;
  receive the dynamic flyer content for the digital flyer from the server, the dynamic flyer content being retrieved based on the selection information;
  display at least a portion of the dynamic flyer content on a viewport of the communication device, the dynamic flyer content organized based on a pre-defined integration template associated with the selected digital flyer, the dynamic content displayed within one or more of the plurality of regions in accordance with the root offset values of the regions in the modular co-ordinate system, and wherein at least one displayed region comprises an interface element;
  update the root offset values of the root co-ordinate to reflect the updated positions of the plurality of regions relative to each other, wherein the updated root offset values are used to convert referenced points in the local coordinate systems of respective regions to the root co-ordinate system without having to update the referenced points within the local coordinate systems;
  display an updated portion of the flyer content in one or more of the plurality of regions in accordance with the updated root offset values; and
  convert points regions specified in the respective local coordinate systems to the root coordinate system using the root offset values of the respective regions.

32. The system according to claim 31, wherein the digital flyer comprises a source flyer image for the dynamic flyer content, the source flyer image having one or more regions.

33. The system according to claim 32, wherein the system is further configured to: display the organized dynamic flyer content in the viewport of the communication device using the offset values of regions in the modular co-ordinate system.

34. The system according to claim 31, wherein the dynamic flyer content is retrieved from an external source using the selection information.

35. The system according to claim 31, wherein the selection information comprises a unique identifier, a surrounding circumstance of the viewer, browsing information of the viewer or an identification information for a loyalty program or a combination thereof.

36. The system according to claim 31, wherein the system is further configured to: categorize the viewer into one or more pre-defined viewer profiles.

37. The system according to claim 36, wherein the dynamic flyer content are organized based on the pre-defined integration template associated with the selected digital flyer and the one or more pre-defined viewer profiles.

* * * * *